(12) United States Patent
Miler et al.

(10) Patent No.: US 11,296,381 B2
(45) Date of Patent: Apr. 5, 2022

(54) HIGH-DENSITY BATTERY PACK

(71) Applicant: Apple Inc., Cupertino, CA (US)

(72) Inventors: Josef L. Miler, San Francisco, CA (US); Alexander J. Clarabut, Sunnyvale, CA (US); Mujeeb I. Ijaz, Los Altos Hills, CA (US); Jonathan Hall, Emerald Hills, CA (US); Luke A. Wilhelm, Sausalito, CA (US); Abraham B. Caulk, San Jose, CA (US); Dirk E. Long, Denver, CO (US); Yu-Hung Li, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 134 days.

(21) Appl. No.: 16/259,584

(22) Filed: Jan. 28, 2019

(65) Prior Publication Data

US 2019/0157636 A1     May 23, 2019

Related U.S. Application Data

(63) Continuation of application No. PCT/US2017/044474, filed on Jul. 28, 2017.

(60) Provisional application No. 62/509,468, filed on May 22, 2017, provisional application No. 62/368,789, filed on Jul. 29, 2016.

(51) Int. Cl.
*H01M 50/20*     (2021.01)
*H01M 10/613*     (2014.01)
*H01M 50/30*     (2021.01)

(52) U.S. Cl.
CPC ......... *H01M 50/20* (2021.01); *H01M 10/613* (2015.04); *H01M 50/30* (2021.01)

(58) Field of Classification Search
None
See application file for complete search history.

(56) References Cited

U.S. PATENT DOCUMENTS 3,053,435 A     9/1962    Sanders et al.
6,278,259 B1 *   8/2001    Kimoto ................. H01M 50/35
                                                           320/147

(Continued)

FOREIGN PATENT DOCUMENTS

CN          2601463 Y     1/2004
CN       101326657 A    12/2008

(Continued)

OTHER PUBLICATIONS

CN203871442U translation (Year: 2014).*

(Continued)

*Primary Examiner* — Ula C Ruddock
*Assistant Examiner* — Amanda Rosenbaum
(74) *Attorney, Agent, or Firm* — Kilpatrick Townsend & Stockton LLP

(57) ABSTRACT

Battery packs are presented. The battery packs include a plurality of cell blocks, each cell block comprising a plurality of battery cells. The battery pack also includes a plenum chamber configured to fluidly couple each of the cell blocks to an exterior of the battery pack in response to a thermal event in the battery cell in a separate cell block. In some embodiments, at least one of the cell blocks is configured to be fluidly coupled to the plenum structure via a cell block vent.

13 Claims, 21 Drawing Sheets

(56) References Cited

U.S. PATENT DOCUMENTS

| | | | |
|---|---|---|---|
| 8,956,747 B2* | 2/2015 | Itoi | H01M 10/613 429/82 |
| 10,923,788 B1 | 2/2021 | Loveness et al. | |
| 2006/0127765 A1 | 6/2006 | Machida et al. | |
| 2006/0172187 A1 | 8/2006 | Ambrosio et al. | |
| 2009/0274952 A1* | 11/2009 | Wood | H01M 10/6566 429/99 |
| 2010/0055556 A1 | 3/2010 | Meschter | |
| 2010/0136391 A1 | 6/2010 | Prilutsky et al. | |
| 2010/0279152 A1 | 11/2010 | Payne | |
| 2011/0020676 A1* | 1/2011 | Kurosawa | H01M 10/615 429/62 |
| 2011/0111273 A1* | 5/2011 | Okada | H01M 2/1211 429/88 |
| 2011/0135975 A1* | 6/2011 | Fuhr | H01M 50/20 429/53 |
| 2011/0195284 A1 | 8/2011 | Yasui et al. | |
| 2012/0002338 A1 | 1/2012 | Smith et al. | |
| 2012/0231306 A1* | 9/2012 | Herron | H01M 50/20 429/53 |
| 2013/0078488 A1 | 3/2013 | Nemoto et al. | |
| 2013/0295428 A1 | 11/2013 | Hatta et al. | |
| 2014/0162107 A1 | 6/2014 | Obrist et al. | |
| 2014/0302368 A1 | 10/2014 | Wang et al. | |
| 2014/0318106 A1 | 10/2014 | Mizuno et al. | |
| 2014/0329121 A1 | 11/2014 | Nishihara | |
| 2015/0244036 A1 | 8/2015 | Lane et al. | |
| 2016/0020447 A1* | 1/2016 | Janarthanam | H01M 2/1223 180/68.5 |
| 2016/0197385 A1 | 7/2016 | Matsumoto et al. | |
| 2016/0218336 A1* | 7/2016 | Herrmann | H01M 2/1235 |
| 2017/0162917 A1 | 6/2017 | Yu et al. | |
| 2019/0267682 A1 | 8/2019 | Seo et al. | |

FOREIGN PATENT DOCUMENTS

| | | | |
|---|---|---|---|
| CN | 101523637 | A | 9/2009 |
| CN | 101627490 | A | 1/2010 |
| CN | 102054951 | A | 5/2011 |
| CN | 203871442 | U * | 10/2014 |
| CN | 204243106 | U | 4/2015 |
| CN | 105518899 | A | 4/2016 |
| CN | 205177921 | U | 4/2016 |
| CN | 105742535 | A | 7/2016 |
| DE | 102013015749 | A1 | 3/2015 |
| EP | 1091438 | A2 | 4/2001 |
| EP | 2262048 | A1 | 12/2010 |
| EP | 2320493 | A1 | 5/2011 |
| JP | 2011175844 | A | 9/2011 |
| WO | 2011134815 | A1 | 11/2011 |
| WO | 2011134828 | A1 | 11/2011 |
| WO | 2018022964 | A1 | 2/2018 |
| WO | 2018023050 | A1 | 2/2018 |

OTHER PUBLICATIONS

PCT/US2017/044474, "International Search Report and Written Opinion", dated Oct. 24, 2017, 12 pages.
U.S. Appl. No. 15/885,126, "Non-Final Office Action", dated Jan. 6, 2020, 20 pages.
Klambauer, et al., "cn.MOPS: Mixture of Poissons for Discovering Copy Number Variations in Next-Generation Sequencing Data with a Low False Discovery Rate", Nucleic Acids Research, vol. 40, No. 9, Feb. 1, 2012, pp. 1-14.
PCT/US2017/044316, "International Preliminary Report on Patentability", dated Feb. 7, 2019, 7 pages.
PCT/US2017/044316, "International Search Report and Written Opinion", dated Nov. 15, 2017, 10 pages.
PCT/US2017/044474, "International Preliminary Report on Patentability", dated Feb. 7, 2019, 9 pages.
U.S. Appl. No. 15/703,114, "Non-Final Office Action", dated Aug. 22, 2019, 20 pages.
U.S. Appl. No. 15/703,114, "Final Office Action", dated Mar. 16, 2020, 22 pages.
U.S. Appl. No. 15/794,200, "Non-Final Office Action", dated Mar. 19, 2020, 23 pages.
U.S. Appl. No. 15/885,126, "Final Office Action", dated Sep. 3, 2020, 14 pages.
U.S. Appl. No. 16/259,440, "Non-Final Office Action", dated Mar. 19, 2021, 12 pages.
U.S. Appl. No. 16/263,907, "Non-Final Office Action", dated Mar. 30, 2021, 12 pages.
U.S. Appl. No. 15/794,200, "Notice of Allowance", dated Oct. 29, 2020, 8 pages.
U.S. Appl. No. 15/885,126, "Non-Final Office Action", dated Aug. 10, 2021, 15 pages.
U.S. Appl. No. 16/263,907, "Non-Final Office Action", dated Nov. 1, 2021, 11 pages.
China Patent Application No. 201910307710.1, "Office Action", dated Jul. 26, 2021, 17 pages.
China Patent Application No. 201910339097.1, "Office Action", dated Jun. 29, 2021, 17 pages.

* cited by examiner

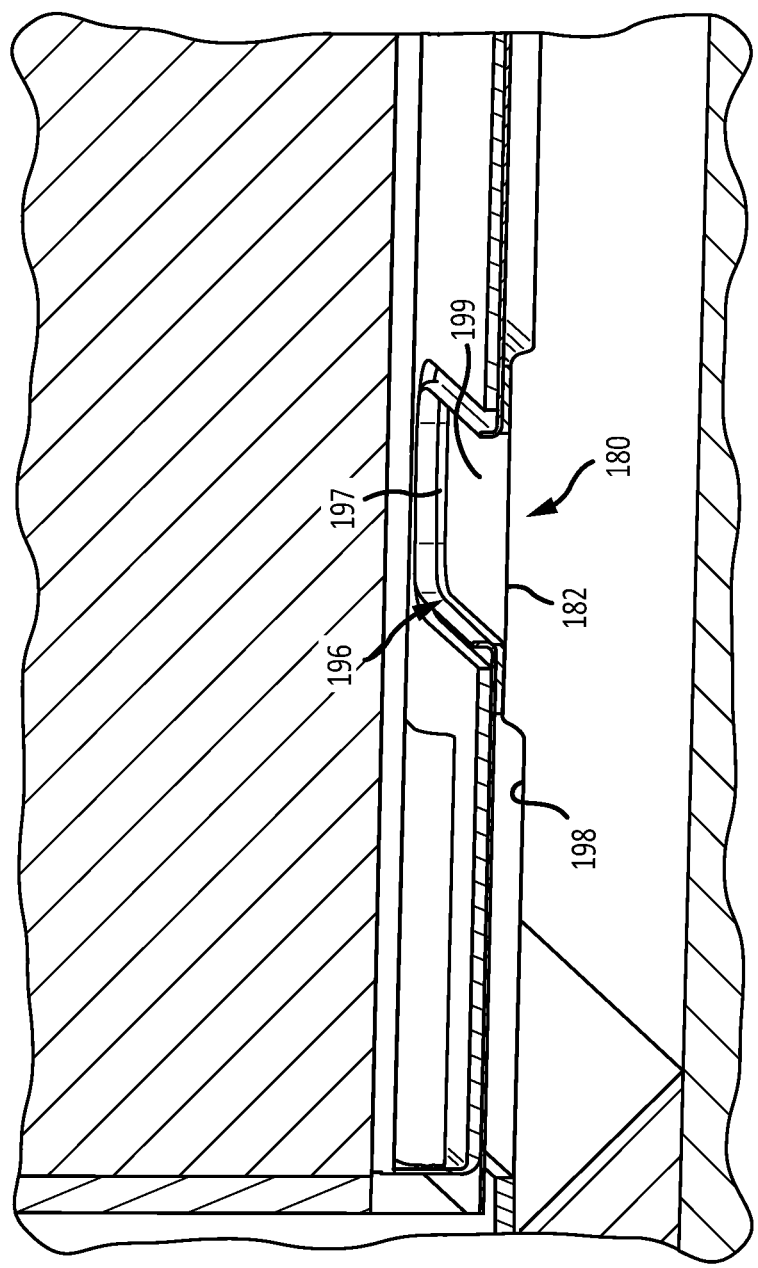

HIGH-DENSITY BATTERY PACK

CROSS-REFERENCE TO RELATED APPLICATIONS

This application is a continuation of International Patent Application No. PCT/US2017/044474, filed Jul. 28, 2017, which claims the benefit of U.S. Application Ser. No. 62/368,789, filed Jul. 29, 2016, and U.S. Application Ser. No. 62/509,468, filed May 22, 2017, the disclosures of which are hereby incorporated by reference in their entirety for all purposes.

FIELD

This disclosure relates generally to battery structures, and more particularly to battery packs.

BACKGROUND

Tight placement of battery cells within a battery pack increases overall energy density of the pack but can impact behavior of the pack under abuse conditions.

SUMMARY

In some embodiments, a battery pack includes a plurality of cell blocks, each cell block comprising a plurality of battery cells. The battery pack also includes a plenum structure configured to fluidly couple each of the cell blocks to an exterior of the battery pack in response to a thermal event in a battery cell in a separate cell block. In some instances, at least one of the cell blocks is configured to be fluidly coupled to the plenum structure via a cell block vent. In further instances, the cell block vent includes a backflow prevention mechanism configured to impede discharged matter from entering the cell block from the plenum structure, and permit discharge of matter from within the cell block into the plenum structure.

In some variations, the plenum structure includes a plurality of plenum chambers coupled together. In these variations, the battery pack includes a first battery module and a second battery module. The first battery module includes a plurality of cell blocks configured to be fluidly coupled to a first plenum chamber, and a second battery module including a second plurality of cell blocks configured to be fluidly-coupled to a second plenum chamber. In certain instances, a lateral member is disposed between the first battery module and the second battery module. The lateral member may include an internal conduit extending from a first port on a first end of the lateral member to a second port on a second end of the lateral member.

In some embodiments, a battery structure includes a battery pack housing that houses a plurality of battery cells. One or more of the battery cells has a battery cell vent that is shaped to direct discharge outward from the battery cell during thermal runaway. For example, a battery cell vent can be located on a side of the battery cell opposite a terminal of the battery cell.

In some embodiments, the battery cell vents can be fluidly-coupled with one or more battery pack vents. The battery pack vents facilitate discharge of matter from one or more battery cells towards an exterior of the battery pack housing. In some examples, the battery pack housing is structured so that battery cell vents are aligned with one or more battery pack vents. In some examples, the battery pack includes a conduit that fluidly-couples one battery pack vent to one battery cell vent. In some examples, the battery pack includes a manifold that fluidly-couples a battery pack vent to two or more battery cell vents. In some variations, the pack vent is fluidly-coupled to one cell vent and has an interface therewith. A seal is disposed along the interface. In some variations, the battery pack includes an integrated vent having a first portion and a second portion. The first portion includes one cell vent and the second portion includes one pack vent.

In other variations, a plate structure is coupled with the battery pack structure to form a plenum chamber. The plate structure includes at least one flow guide and at least one occluding member. The at least one flow guide and the at least one occluding member operate, during the thermal runaway event, to facilitate flow of vapor released from the cell vents towards a plenum vent to an external ambient environment and impede flow of battery material discharged from the cell vents towards the plenum vent.

BRIEF DESCRIPTION OF THE DRAWINGS

The disclosure will be readily understood by the following detailed description in conjunction with the accompanying drawings.

FIG. 1H is a schematic cross-section of a cell block vent having a seal that includes a gasket, in accordance with an illustrative embodiment;

DETAILED DESCRIPTION

Reference will now be made to exemplary embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Figure 1A:
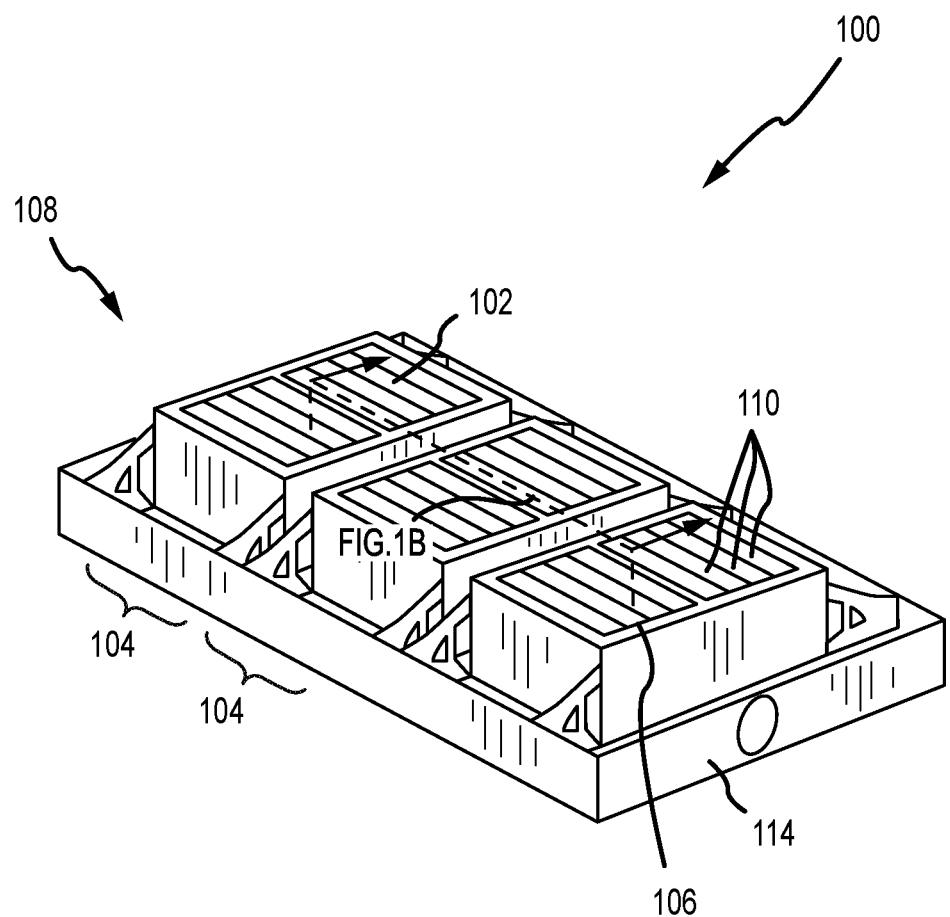
FIG. 1A is a perspective view of a battery pack, in accordance with an illustrative embodiment.

FIG. 1A depicts a perspective view of a battery pack 100, in accordance with an illustrative embodiment. The battery pack 100 has cell blocks 102 arranged in lateral rows, each lateral row defining a battery module 104. Adjacent battery modules 104 are separated by lateral members 106, which can also function as load-bearing members within the battery pack 100. Within each battery module 104, the cell blocks 102 may be electrically-coupled in series, in parallel, or some combination thereof. The battery pack 100 may optionally include one or more pack vents 108 that fluidly-couples the cell blocks 102 to an exterior of the battery pack 100. For example, battery pack 100 may include a pack vent on each end of battery pack 100.

Pack vents 108 may be incorporated within modules associated with a front panel 107 and/or a rear panel 109 of the battery pack structure. Front panel 107 and rear panel 109 may be end panels that at least partially define a perimeter of the battery pack 100. The end panels may be coupled with side rails 111, 113 to fully define an outer perimeter of the battery pack 100. Side rails 111, 113 may provide structural rigidity to the battery pack 100 and may be configured to support battery modules 104 within the pack. The end panels and side rails may be made of any number of materials including aluminum, steel, composites, plastics, alloys, or other materials that may provide weight and/or robustness to the structure of battery pack 100.

Each cell block 102 includes a plurality of battery cells 110 disposed therein, although each cell block may also contain a single battery cell 110. The plurality of battery cells 110 may be electrically-coupled in series, in parallel, or some combination thereof. In FIG. 1A, four battery cells 110 are depicted within each cell block 102. However, this depiction is not intended as limiting. Any number of battery cells 110 can be placed in each cell block 102. Moreover, the number of battery cells 110 in each cell block 102 need not be the same. Different numbers of battery cells 110 are possible for each cell block 102.

It will be appreciated that the cell blocks 102 represent a unit for containing thermal runaway between cells within the battery pack. Should a thermal runaway event occur, the thermal runaway event will be limited to batteries in a particular cell block 102. If a single battery cell 110 fails, other battery cells 110 within a particular cell block 102 in the battery pack 100 will be exposed to rapid heating. The thermal runaway of a single battery cell (and effects thereof) is limited to the battery cells 110 within a cell block.

Figure 1B:
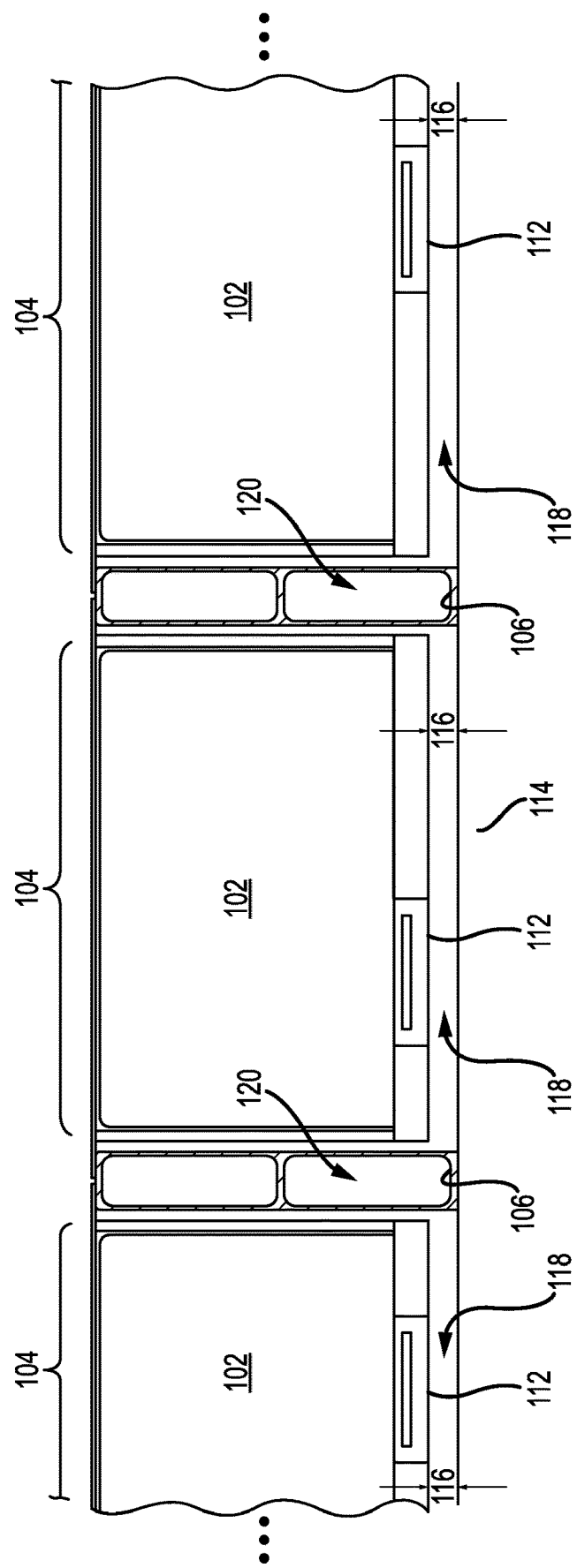
FIG. 1B is a detail view, shown in cross-section, of a portion of the battery pack of FIG. 1A, in accordance with an illustrative embodiment.

Turning now to FIG. 1B, a detail view is shown, in cross-section, of a portion of the battery pack 100 of FIG. 1A. The detail view is perpendicular to a lateral direction of the battery modules 104 (see dashed lines and arrows in FIG. 1A). Each cell block 102 includes a corresponding cell block vent 112, which is oriented towards a plate structure 114 of battery pack 100. The cell block vents 112 are operable to open during a thermal runaway event, thereby allowing matter to discharge from their respective cell blocks 102. Matter discharged from a cell block 102 may result from one or more battery cells 110 overheating (i.e., battery cells 110 within the cell block 102). Such matter can include solid materials such as battery electrolyte materials, separator materials, and electrode materials. Such matter can also include gaseous matter, such as vapors resulting from a decomposition of battery materials, or the burning of electrolyte, separator, and/or electrode materials.

During opening of a cell block vent 112, the plate structure 114 may receive and redirect matter discharged from a corresponding cell block 102. However, the cell block vent 112 may be configured to redirect matter being discharged out of its respective cell block 102. For example, and without limitation, the cell block vent 112 may form a flow guide upon opening. The cell block vent 112 may also be configured to inhibit or prevent matter from entering a neighboring cell block.

Further, cell block vent 112 may be configured to allow only an outward flow of matter (i.e., flow from an interior of a cell block 102 to its exterior). In some embodiments, the cell block vents 112 include a backflow prevention mechanism. The backflow prevention mechanism is configured to impede discharged matter from entering a cell block 102, yet permit discharge of matter from within the cell block 102.

The cell block vent 112 can be manufactured as an integral portion of its corresponding cell block, or alternatively, manufactured separately therefrom. In the latter case, the cell block vent 112 may be coupled to a cell block via adhesive, welding, one or more mechanical fasteners, or any combination thereof. Additionally, cell block vents may be coupled with the cell block structure via a polymeric membrane or other polymeric material. The polymeric material may be configured to weaken, break, or fail as a surrounding environmental temperature exceeds a threshold, which may be associated with, for example, delivery of vented material from one or more cells of a cell block.

In various embodiments, the cell block vent 112 can include (or be formed of) a dielectric material. The dielectric material may provide electrical insulation, thereby providing back-up protection against electrical shorts. Non-limiting examples of the dielectric material include aluminum oxide materials, silicon dioxide materials, polytetrafluoroethylene materials, and polyimide materials.

Figure 1C:
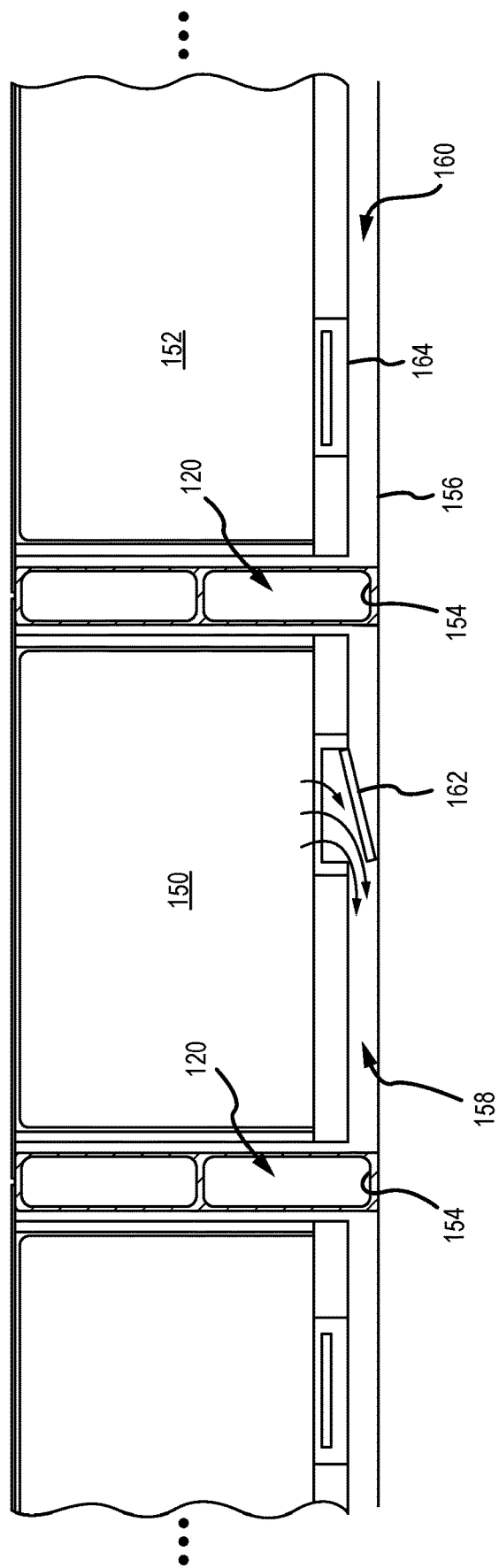
FIG. 1C is a cross-sectional view of a first cell block and a second cell block in a battery pack, in accordance with an illustrative embodiment.

Now turning to FIG. 1C, a cross-sectional view is presented of a first cell block 150 and a second cell block 152, in accordance with an illustrative embodiment. The first cell block 150 and the second cell block 152 are analogous to those described in relation to FIGS. 1A-1B. In the embodiment of FIG. 1C, the first cell block 150 and the second cell block 152 are separated by lateral members 154 on each side that support the cell blocks 150, 152 above a plate structure 156. Such support allows a gap to form, thereby forming a volume into which effluents (discharged matter and gasses) from cell blocks can flow when their respective cell vents open. As illustrated, this volume includes first and second chambers 158 and 160 separated by lateral member 154. The first cell block 150 and the second cell block 152 include corresponding cell block vents 162 and 164 for discharging matter. Chambers 158 and 160 may be referred to as plenum chambers, and the volume formed by at least chambers 158 and 160 may be referred to as a plenum structure.

FIG. 1C depicts the first cell block 150 directing matter in a particular direction. The first cell block 150 may discharge matter into the first plenum chamber 158 (see arrows), which sits at a lower pressure than the first cell block 150 (e.g., at atmospheric pressure). The cell block vent 162 redirects matter discharged from the first cell block 150, thereby preventing such discharged matter from directly impinging upon the plate structure 156. The discharged matter dissipates energy by expanding within the first plenum chamber 158. The first plenum chamber 158 may be defined from below by the plate structure 156, which may partially define the plenum chamber, and may additionally provide structural protection for the battery pack from below.

With further reference to FIG. 1C, matter discharged through the cell block vent 162 is redirected to flow within the first plenum chamber 158, which may involve a lateral flow (i.e., flow parallel to the lateral members 154). In FIG. 1C, lateral flow occurs along directions into and out of the cross-sectional view. Re-direction of matter so-discharged may be aided by the plate structure 156, the cell block vent 162, or both. In certain instances, the discharged matter (or portions thereof) may enter one or more ports disposed along sides of the lateral members 154 (i.e., lateral members 154 adjacent the first plenum chamber 158).

Matter discharged through the cell block vent 162 may include vapors, gases, char, electrolyte fluid, and solid matter. Solid matter can include solid battery material such as cathode active material, anode active material, separator material, and so forth. In this capacity, the cell block vent 162 may allow for a rapid reduction of pressure within the first cell block 150 (or battery cells therein) by transferring discharged matter from the cell block 150 into the first plenum chamber 158. This transfer may also reduce a temperature of the cell block 150 (or battery cells therein).

Figure 1D:
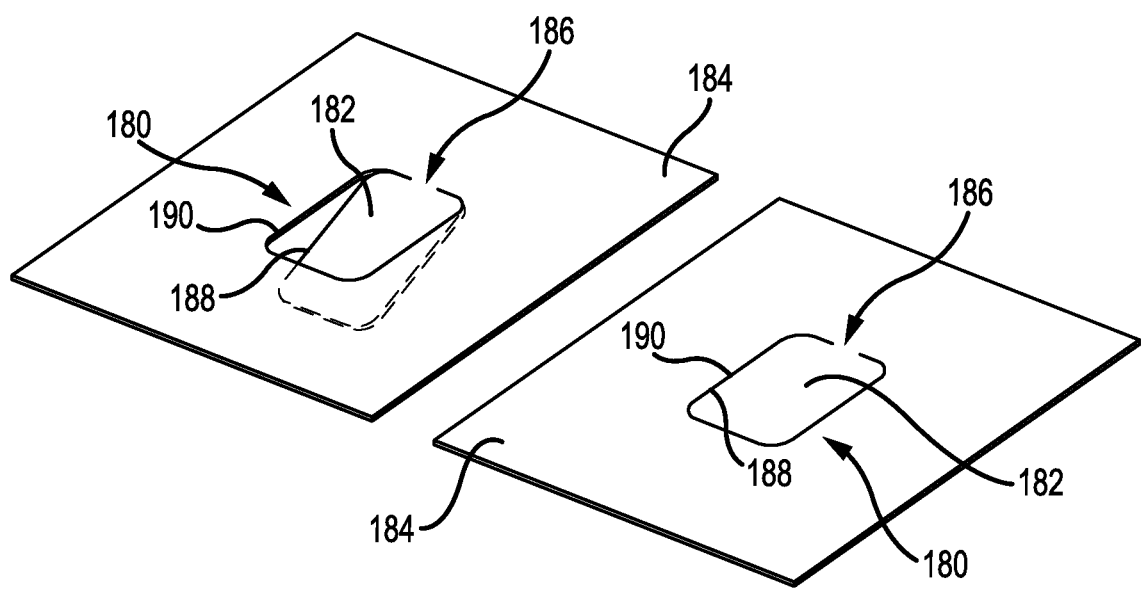
FIG. 1D is a perspective view of a cell block vent, in accordance with an illustrative embodiment.

It will be appreciated that the cell block vents 112, 162, and 164 of FIGS. 1A-1C may be configured to regulate flows of discharged matter, including guiding such flows into a plenum chamber. FIG. 1D presents a perspective view of one such embodiment. The cell block vent 180 includes a trap door 182 that has been cut into a sheet of material 184 (e.g. a metal sheet such as aluminum or steel). Uncut portion 186 serves as a bendable joint. Under ordinary operation, cell block vent 180 remains closed. When pressure builds within the cell block, trap door 182 opens into a canted position. The canted position may create an exit gap at least 2 mm relative to the sheet of material 184, as measured at an end opposite the uncut portion 186. The canted position allows the opened trap door 182 to function as a flow guide, changing a direction of matter discharged during the thermal runaway event. In certain instances, this change in direction prevents matter from impinging perpendicularly onto an object (e.g., impinging perpendicularly onto the plate structure 114 of FIGS. 1A & 1B).

The cell block vent 180 is also configured to prevent an inward flow of matter. An outer edge 188 of the "trap door" 182 mates with an inner edge 190 of the sheet of metal 184 via beveled surfaces. These beveled surfaces establish a perimeter that shrinks along a first direction perpendicular to the sheet of metal 184. However, along a second direction opposite the first, the perimeter expands. Thus, the "trap door" 182 is blocked from motion along the first direction, but can open along the second direction.

In FIG. 1D, the "trap door" 182 is depicted as blocked from motion above the sheet of metal 184, but can open below the sheet of metal 184. However, this depiction is not intended as limiting. The cell block vent can be formed from a portion different than its corresponding cell block.

In some variations, the cell block vent 180 can be formed into a cell block by stamping, cutting, laser ablation, or a combination thereof. For example, and without limitation, the cell block vent 180 may be formed using a laser to ablate a bevel cut (e.g., 45°) into the sheet of metal 184, which may correspond to a portion of a cell block.

Figure 1E:
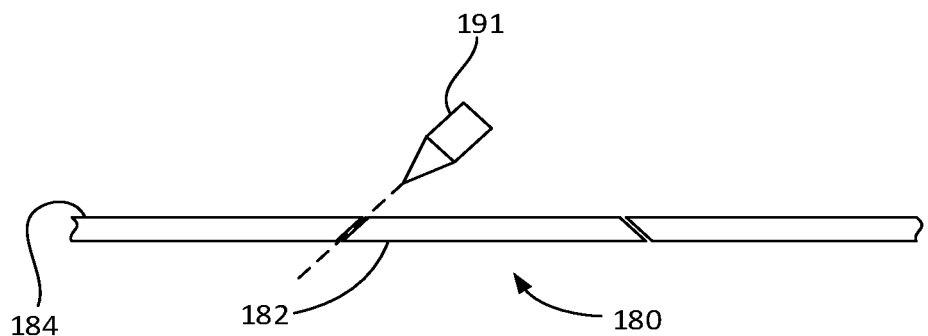
FIG. 1E is a schematic cross-section of the cell block vent of FIG. 1D, showing laser cutting of the cell block vent, in accordance with an illustrative embodiment.

FIG. 1E presents a schematic cross-section of a portion of the cell block vent 180 of FIG. 1D, in accordance with an illustrative embodiment. The portion of the cell block vent 180 includes the sheet of metal 184 and the "trap door" 182. A laser 191, which is angled relative to the sheet of metal 184, cuts a bevel in the sheet of metal 184 to form the "trap door" 182 along the plane of the dashed line. Displacement of the laser 191 relative to the sheet of metal 184 allows the laser 191 to cut the sheet of metal 184 continuously.

Figure 1F:
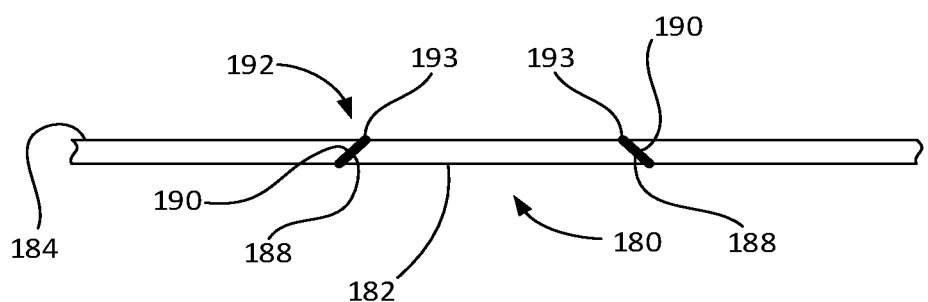
FIG. 1F is a schematic cross-section of the cell block vent of FIG. 1D having a seal that includes a sealing compound, in accordance with an illustrative embodiment.

It will be appreciated that the cell block vent 180 may include a seal, such as a seal to occlude a cut in the sheet of metal 184. FIG. 1F presents a schematic cross-section of the cell block vent 180 of FIG. 1D, but in which the cell block vent 180 has a seal 192 formed by a sealing compound 193, in accordance with an illustrative embodiment. The sealing compound 193 is disposed in a gap between the trap door 182 and the sheet of material 184. The seal 192 formed by the sealing compound 193 may have a thickness measured along a distance that extends from the outer edge 188 of the "trap door" 182 to the inner edge 190 of the sheet of metal 184. The distance may be oriented perpendicular to surfaces of the outer edge 188 and the inner edge 190.

In some instances, the sealing compound thickness is at least 0.0005 in. In some instances, the thickness is at least 0.001 in. In some instances, the thickness is at least 0.002 in. In some instances, the thickness is at least 0.003 in. In some instances, the thickness is at least 0.004 in. In some instances, the thickness is no greater than 0.005 in. In some instances, the thickness is no greater than 0.004 in. In some instances, the thickness is no greater than 0.003 in. In some instances, the thickness is no greater than 0.003 in. In some instances, the thickness is no greater than 0.001 in.

The upper and lower limits of the thickness may be combined in any variation as above to define a range. For example, and without limitation, the thickness may be at least 0.002 in. but no greater than 0.004 in. In another non-limiting example, the thickness may be at least 0.0005 in. but no greater than 0.005 in. Other ranges are possible.

Figure 1G:
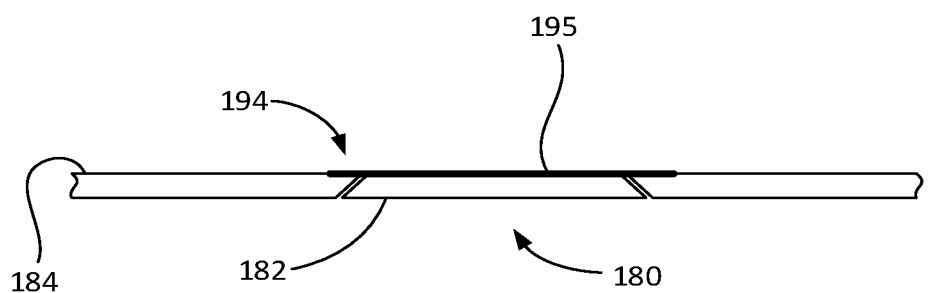
FIG. 1G is a schematic cross-section of the cell block vent of FIG. 1D having a seal that includes a thin polymeric material, in accordance with an illustrative embodiment.

It will be understood that the seal of the cell block vent 180 is not necessarily limited to a sealing compound. FIG. 1G presents a schematic cross-section of the cell block vent 180 of FIG. 1D, but in which the cell block vent 180 has a seal 194 formed by a thin polymeric material 195, in accordance with an illustrative embodiment. The thin polymeric material 195 may be a film or layer. The thin polymeric material 195 is coupled to the sheet of metal 184, which, in some instances, can include a pressure-sensitive adhesive material. The pressure-sensitive adhesive material may allow the seal 194 to fail at a pressure, thereby allowing trap door 182 to open outward (e.g., downward in the exemplary orientation of FIG. 1G). In some instances, the failure pressure can be pre-selected, for example based on the pressure-sensitive adhesive material, used, thickness thereof, and other variables.

The seal of the cell block vent 180 may also include a gasket. FIG. 1H presents a schematic cross-section of the cell block vent 180 of FIG. 1D, but in which the cell block vent 180 has a seal 196 formed by a gasket 197. The gasket 197 may include an elastomeric material (e.g., neoprene, silicone rubber, fluoropolymer elastomer, etc.). In some instances, the gasket 197 may be supported by a battery pack structure 198, which can serve to define part of a plenum and include a trap door 182. The gasket 197 may also be used in conjunction with other types of seals. For example, and without limitation, a thin polymer film 199 may be disposed over the trap door 182 and adjacent the gasket 197.

In some embodiments, cell block vents can be recessed within their respective cell blocks. FIG. 1H depicts such an embodiment. Cell block vent 180 is in a recessed configuration and has a portion shared in common with the battery pack structure 198. However, this depiction is not intended as limiting. Other configurations are possible (e.g., protruding). Moreover, the cell block vent 180 may be entirely separate from the battery structure 198. Such configurations may improve protection of cell block vents from discharges of neighboring cell blocks.

In general, a seal of a cell block vent may function as an environmental seal protecting an interior of the cell block from water, dust intrusion, and so forth. The seal may also protect the interior of the cell block from vent gasses generated by neighboring cell blocks (i.e., during thermal runaway of the neighboring cell blocks). The seal may additionally serve as a predetermined point of failure, allowing the cell block vent 180 to open at low pressures (i.e., less than 20 psi). Depending on a design of the cell block, such low pressures may avoid excessive stresses from building up within the cell block during thermal runaway.

In some embodiments, the seal fails at a pressure no greater than 20 psi. In some embodiments, the seal fails at a pressure no greater than 15 psi. In some embodiments, the seal fails at a pressure no greater than 10 psi. In some embodiments, the seal fails at a pressure no greater than 5 psi. In some embodiments, the seal fails at a pressure no greater than 2.5 psi. In some embodiments, the seal fails at a pressure no greater than 1.5 psi.

In some embodiments, the seal fails at a pressure of at least 0.5 psi. In some embodiments, the seal fails at a pressure of at least 1.5 psi. In some embodiments, the seal fails at a pressure of at least 2.5 psi. In some embodiments, the seal fails at a pressure of at least 5 psi. In some embodiments, the seal fails at a pressure of at least 10 psi. In some embodiments, the seal fails at a pressure of at least 15 psi.

The upper and lower limits of the pressure may be combined in any variation as above to define a range. For example, and without limitation, the seal may fail at a pressure from 1.5 to 5 psi. In another non-limiting example, the seal may fail at a pressure from 2.5 to 10 psi. Other ranges are possible.

In some variations, the seal, such as the seal 194 in FIG. 1G and the seal 196 in FIG. 1H, may have a seal length equivalent to a length of cut in a sheet of metal that forms a "trap door". A ratio of door area to seal length may influence an opening pressure for the "trap door". The door area is determined by dimensions of the "trap door" (i.e., size and shape). As such, this ratio can be selected to match a pressure requirement for the cell block. For example, and without limitation, a circular configuration for a "trap door" can have a lower opening pressure than a long, thin configuration. In a further non-limiting example, the circular configuration has the lowest opening pressure and the long, thin configuration has the highest opening pressure.

Referring again to FIG. 1B, the lateral members 106 suspend the battery modules 104 (or cell blocks 102) above the plate structure 114 to establish a gap 116 therebetween. The gap 116 helps define a plenum chamber 118 below each battery module 104. The plenum chamber 118 represents a partitioned volume within the battery pack 100. Such partitioning limits a supply of freely-available oxygen within the plenum chamber 118. Thus, an amount of oxygen in the plenum chamber 118 may be inadequate to support ignition, or alternatively, may be sufficient to support only partial ignition.

In one aspect, the plenum chamber 118 can receive discharges of matter from an adjacent battery module 104. These discharges are regulated by the cell block vents 112. Without wishing to be limited to a particular mechanism or mode of action, the cell block vents 112 may open in response to a pressure differential between the cell block 102 and the plenum chamber 118. For example, when pressure within a cell block achieves a higher pressure than the pressure in the plenum chamber, a corresponding cell block vent may open to allow matter from the cell block 102 to discharge into the plenum chamber 118. In some variations, lateral members 106 may include an internal conduit 120 to fluidly couple ports disposed on opposite sides thereof. The internal conduit 120 may allow fluid communication between plenum chambers 118 adjacent the opposite sides. Such fluid communication may allow matter discharged into one plenum chamber to traverse a lateral member 106 and flow into the other plenum chamber.

Figure 2A:
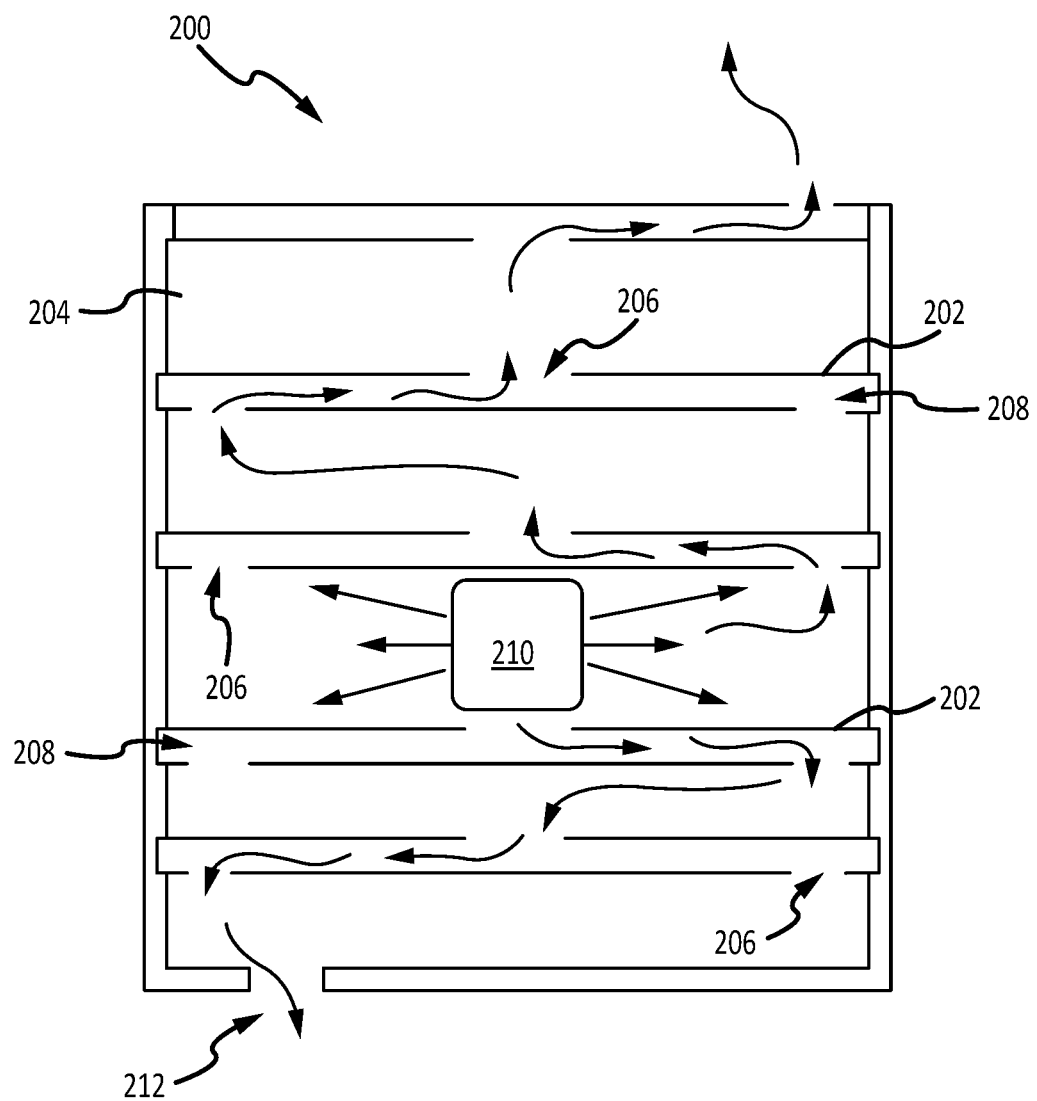
FIG. 2A is a schematic diagram, shown in a top plan view, of a portion of a battery pack, in accordance with an illustrative embodiment.

FIG. 2A presents a schematic diagram, shown in a top plan view, of a portion of a battery pack 200, in accordance with an illustrative embodiment. The battery pack 200 may be analogous to the battery pack 100 of FIG. 1A. However, for purposes of illustration, some components of the battery pack 200 have been omitted. The battery pack 200 includes a plurality of lateral members 202 disposed on (or coupled to) a plate structure 204. Each lateral member 202 includes ports 206 that are fluidly coupled to each other by an internal conduit 208. An exemplary cell block 210 is shown in FIG. 2A. Cell block 210 may be analogous to the cell blocks 102 described in relation to FIGS. 1A-1C.

The lateral members 202 enhance mechanical strength and rigidity of the battery pack 200. The lateral members 202 also establish a tortuous pathway that impedes propagation of discharged matter (from one or more cells) through the battery pack 200, thereby reducing the amount of discharged matter exiting the battery pack 200. For example, and without limitation, one or more changes in direction along the tortuous path helps in separating particulates, such as hot or molten debris, from gaseous components in the discharged matter through inertial separation. The tortuous pathway also lengthens the distance through which discharged matter must propagate before exiting battery pack 200, which can reduce the temperature of any discharged matter that exits battery pack 200.

In the example of FIG. 2A, the lateral members 202 are beams of aluminum formed by extrusion or beams of stamped steel. The beams include void spaces or perforations that, in addition to providing weight savings, also contribute to the tortuous pathway. In another non-limiting example, the lateral members 202 may include screens or meshes within a flow path defined by void spaces therein (e.g., internal channels or conduits). It will be appreciated that such features may increase a structural surface area exposed to discharged matter flowing through the tortuous pathway. By doing so, the lateral members 202 improve heat removal from the discharged matter. Improved heat removal may be beneficial in embodiments where the battery pack 200 exhausts the discharged matter out of a pack vent.

Figure 2B:
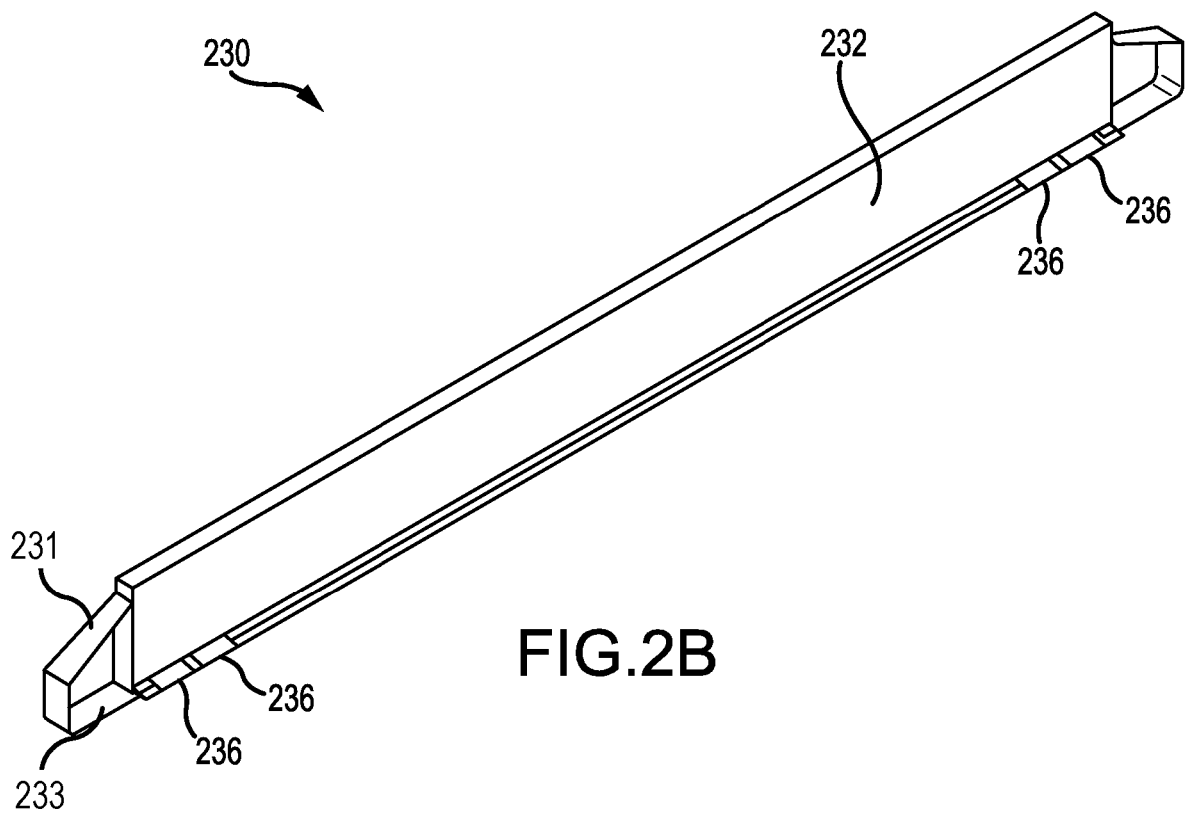
FIG. 2B is a perspective view of a first side of a lateral member, in accordance with an illustrative embodiment.
Figure 2C:
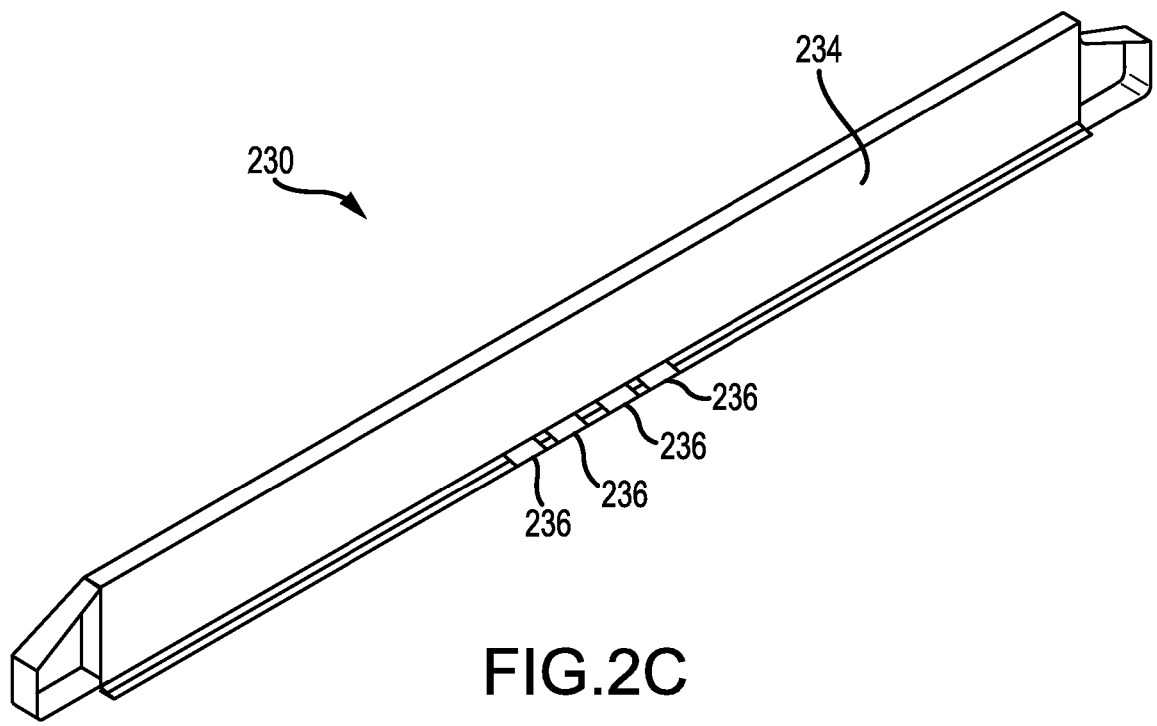
FIG. 2C is a perspective view of a second side of the lateral member of FIG. 2B, in accordance with an illustrative embodiment.

FIGS. 2B & 2C present perspective views of, respectively, a first side 232 and a second side 234 of a lateral member 230, according to an illustrative embodiment. The lateral member 230 may be analogous to lateral members 106, 154, 202 described in relation FIGS. 1A-1C & 2A. The first side 232 is disposed opposite the second side 234. Two ports 236 are disposed on the first side 232 proximate each end of the lateral member 230 (see FIG. 2B). Similarly, four ports 236 are disposed on the second side 124 in a center of the lateral member 230 (see FIG. 2C). Ports 236 on the first side 232 are fluidly-coupled to ports 236 on the second side 234 via an internal conduit (e.g., see internal conduit 120 of FIG. 1B). However, in general, the ports 236 may be disposed in any number and position such that at least one change in direction occurs for discharged matter entering one side of the lateral member 230 to exit the other. The ports 236 may also have any shape.

Lateral member 230 may include a buttress 231 on one or both ends of the structure. Buttress 231 may be coupled with side rails 111 and/or 113 in embodiments. The coupling may include welding, bonding, adhesive, fasteners, or other materials for fixedly coupling the buttress portion of the lateral member 230 to the side rails. Buttress 231 may define one or more apertures 233 through the structure. Apertures 233 may provide access across the lateral members for various mechanical or electrical structures. For example, control cables or wiring may be passed from one battery module to the next to communicatively couple two or more modules together in a variety of ways. Additionally, bus bars may be passed through apertures 233 to electrically couple two or more modules together in a variety of ways.

Lateral members 230 may provide both gas mitigation capabilities during cell events as well as structural integrity to the battery pack, and between modules. Lateral members 230 may provide rigidity and support against vibration of the battery pack by supporting cell blocks and modules. The lateral members 230 may additionally operate as heat sinks both during normal operation and during cell events as previously described. While the interior gaps within lateral members 230 may operate to isolate battery modules from one another, the outer walls of lateral members 230 may provide conductive removal of heat to be transferred along lateral members 230 to other structural elements for heat dissipation.

It will be appreciated that the internal conduit allows discharged matter to traverse the lateral member 230. Ports 236 of the lateral members 230 may be positioned to control a distance of flow therein. Ports 236 and the internal conduit of each lateral member 230 are operable to establish a tortuous pathway through a battery pack (e.g., the battery pack 200 of FIG. 2A). The tortuous pathway includes one or more changes in direction. Such changes in direction may be any value from 0° to 180° relative to an initial direction.

With further reference to FIG. 2B, in some variations the entrance port for matter from one battery cell can be the exit port for another battery cell. Matter entering and exiting ports 236 would still undergo a series of turns within lateral member 230. Solid matter can be retained, while vapor matter can continue through the tortuous path.

Now referring back to FIG. 2A, one or more battery cells within the representative cell block 210 may experience a thermal runaway event, yielding an unstable or failing cell block. A corresponding cell block vent of the unstable cell block 210 may open, allowing matter to discharge into a plenum chamber below the battery module. The discharged matter may then follow one or more tortuous pathways that traverse multiple plenum chambers. While traveling along these tortuous pathways, ports 206 and internal conduits 208 of the lateral members 202 force the discharged matter to make at least one change in direction therealong (see arrows). It will be appreciated that cell block vents downstream of the unstable cell block 210 prevent the discharged matter from entering into their corresponding cell blocks.

Expansion of the discharged matter continues progressively through adjacent plenum chambers until the discharged matter has insufficient energy to travel further. In some instances, the discharged matter may reach a pack vent 212, where the discharged matter (or portion thereof) is ejected into an exterior of the battery pack 200. The pack vent 212 may contain a screen, filter, or other separation member to retain certain components of the discharged matter within the battery pack 200 (e.g., particles). Other possible locations for the screen, filter, or separation member include the ports 206 and internal conduits 208 of the lateral members 202.

A tortuous pathway, by virtue of its at least one change in direction, is capable of separating solid matter from gaseous matter. By forcing matter through changes in direction, the solid matter can be retained within the tortuous pathway. In many instances, this separation results in solid matter being retained within the battery pack 200. Such retention can inhibit or prevent solid matter from accessing an ambient environment, which is abundant in oxygen. Limiting exposure of the solid matter to ambient oxygen mitigates a risk of ignition outside the battery pack 200.

In some variations, the tortuous pathway is capable of cooling the discharged matter. The tortuous pathway presents an extended path of travel for any matter discharged from a cell block vent. During flow through the tortuous pathway, the discharged matter cools by transferring thermal energy to components of the battery pack 200 (e.g., the lateral members 202, the plate structure 204, etc.). Air within the battery pack 200 may also mix with the discharged matter, absorbing thermal energy and cooling the discharged matter. As a result of this cooling, the discharged matter may be rendered incapable of igniting.

Each change in direction associated with the tortuous pathway may be any value from 0° to 180° relative to an initial direction. In some variations, the change in direction corresponds to a value equal to or greater than a lower limit. Non-limiting examples of the lower limit include 10°, 30°, 45°, 60°, 90°, 120°, 135°, and 150°. Other lower limits are possible. In some variations, a change in direction corresponds to a value equal to or less than an upper limit. Non-limiting examples of the lower limit include 180°, 150°, 135°, 120°, 90°, 60°, 45°, and 30°. Other upper limits are possible. It will be appreciated that the lower limit and upper limit may be combined in any variation as above to define a range for the change in direction. For example, and without limitation, the change in direction may correspond to a range from 60° to 135° relative to the initial direction. Other ranges are possible.

Although FIG. 2A depicts the unstable cell block 210 as being in a middle portion of the battery pack, this depiction is not intended as limiting. The unstable cell block 208 may be any position of the battery pack 200.

Figure 2D:
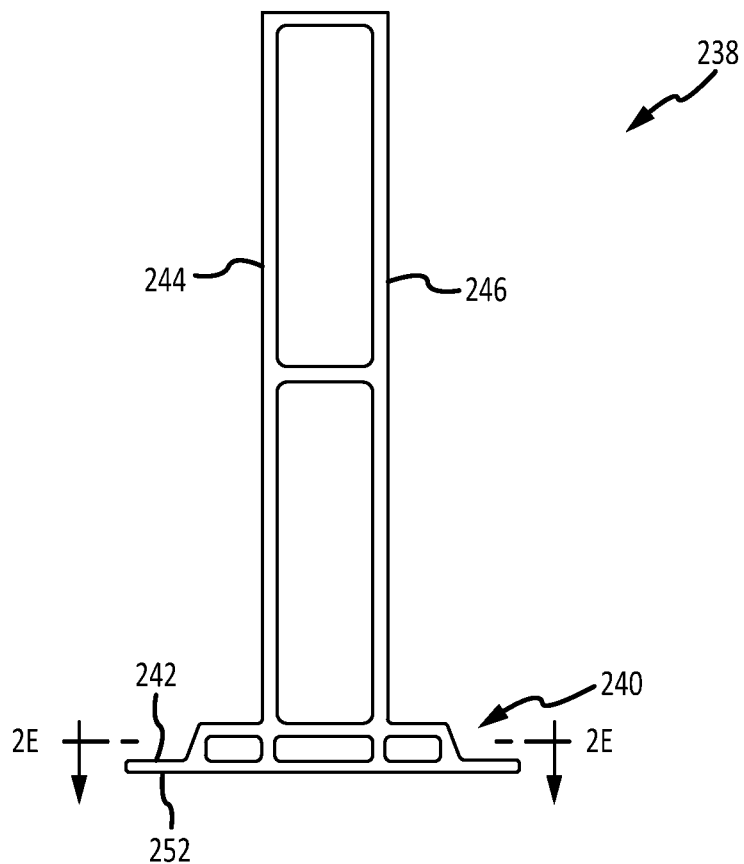
FIG. 2D is a cross-sectional view of a lateral member that includes a throughway therethrough, in accordance with an illustrative embodiment.

It will be appreciated that other structural features of a lateral member may be used to define the tortuous pathway. FIG. 2D presents a cross-sectional view of a lateral member 238 that includes a throughway 240, in accordance with an embodiment. The throughway 240 is disposed at a base 242 of the lateral member 238 and allows fluid communication between volumes adjacent a first side 244 and a second side 246. The lateral member 238 may be analogous to lateral members 106, 202, 230 described in relation to FIGS. 1A-1C and 2A-2C.

Figure 2E:
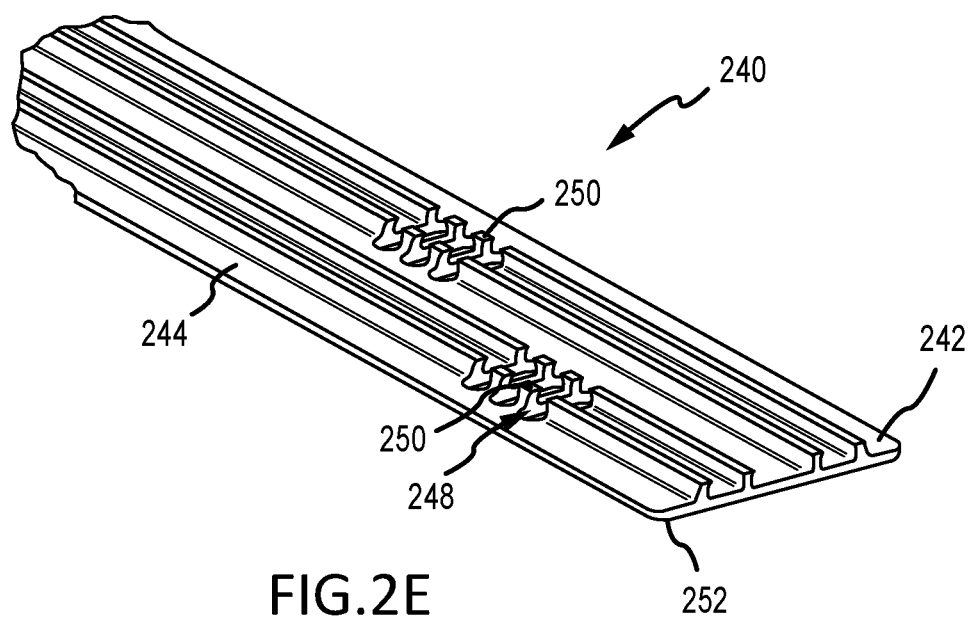
FIG. 2E is a perspective view, shown in cross-section, of the throughway of FIG. 2D, in accordance with an embodiment.

The throughway 240 may include spaces that allow discharged matter to traverse the lateral member 238 from the first side 244 to the second side 246, or vice versa. FIG. 2E presents a perspective view, shown in cross-section, of the throughway 240 of FIG. 2D, in accordance with an embodiment. The lateral member 238 may include internal voids (e.g., conduits, channels, enclosed cavities, etc.) to reduce its mass. Such voids may be selected by those skilled in the art to maintain a strength or stiffness given a reduction of material in the lateral member 238. The lateral member 238 may also include one or more spaces 248, proximate the base 242, that collectively define the throughway 240. The spaces 248 extend from the first side 244 of the lateral member 238 to the second side 246. By virtue of the spaces 248, volumes adjacent the first side 244 and second side 246 can be fluidly-coupled. Spaces 248 are depicted as arrays of spaces 248, each array having spaces 248 aligned perpendicular to the first and second sides 244, 246 of the lateral member 238. However, this depiction is not intended as limiting. Other arrangements are possible for the spaces 248.

The spaces 248 are separated by pillar structures 250 formed by material of the lateral member 238. The pillar structures 250 may decrease a velocity of matter traversing the throughway 240. For example, and without limitation, the pillar structures 250 may be spaced such that the matter traversing the throughway 240 impinges upon the pillar structures 250 or drags along surfaces thereof. The pillar structures 250 may also induce turbulence in matter traversing the throughway 240. Without wishing to be limited to any mechanism or mode of action, such turbulence may result from impingement upon the pillar structures 250 or drag along surfaces of the pillar structures 250.

Spaces 248 may be spaced and oriented to order the pillar structures 250 into a lattice (or groups of such lattices). Such ordering may influence a degree of turbulence experienced by matter traversing the throughway 240. The ordering may also allow the pillar structures 250 to increase an interaction of matter traversing the throughway 240 with surfaces of the pillar structures 250.

In some variations, such as shown in FIG. 2E, adjacent rows of pillar structures are aligned such that flow paths therethrough are unimpeded. In other embodiments, adjacent rows of pillar structures 250 are offset relative to each other to create flow paths having impediments thereon. In some embodiments, the lateral members 238 have slots formed into the base 242. In these embodiments, each slot may extend from a bottom side 252 of the lateral member 238 to a single space.

Figure 2F:
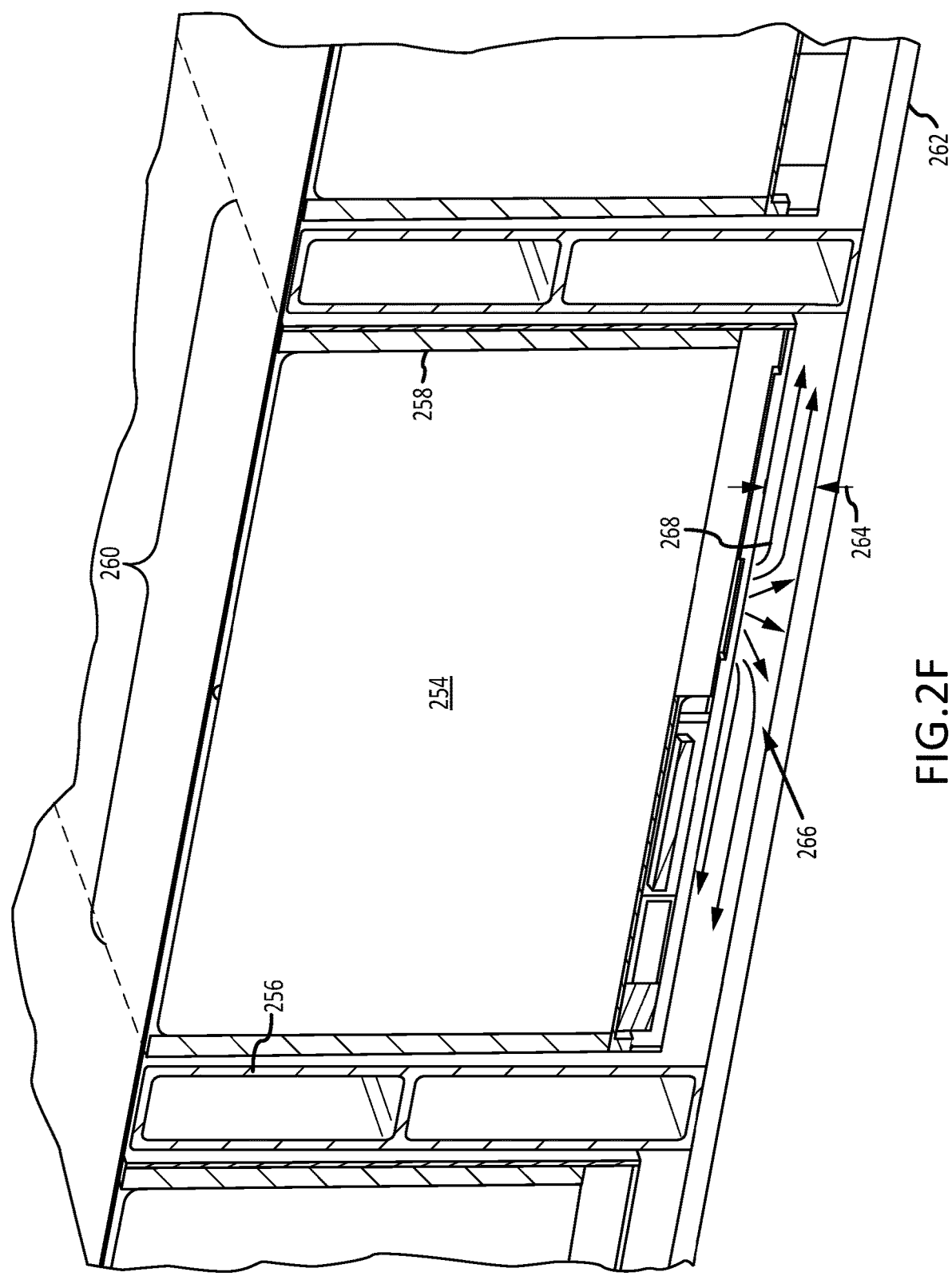
FIG. 2F is a perspective view of a cell block disposed between a first lateral member and a second lateral member, in accordance with some embodiments.

During operation, the pillar structures 250 allow the lateral member 238 to establish a tortuous pathway (or portion thereof) for matter discharged from cell blocks. FIG. 2F presents a perspective view of a cell block 254 disposed between a first lateral member 256 and a second lateral member 258, in accordance with an embodiment. The cell block 254 is part of a battery module 260, which in turn, serves as part of a battery pack. The first and second lateral members 256, 258 can be the lateral member 238 described in FIGS. 2D-2E. The cell block 254 is suspended by the first and second lateral members 256, 258 above a plate structure 262. This suspension forms a gap 264 between the cell block 254 and the plate structure 262 that is common to all cell blocks in the battery module 260. The gap 264 thereby helps to define a plenum chamber 266 below the battery module 260.

Cell block 254 may discharge matter from one or more failing batteries into the plenum chamber 266, as shown by arrows 268. The plate structure 262 redirects this discharged matter towards respective throughways 270, 272 of the first and second lateral members 256, 258. In some instances, such redirection is assisted by a cell block vent of the cell block.

While traversing the throughways 270, 272, the discharged matter encounters pillar structures 274 that decrease a velocity of the discharged matter. The pillar structures 274 may also induce turbulent flow within the discharged matter that causes changes in direction. As a result, the pillar structures 274 may increase a chance to trap debris from the discharged matter, such as hot particles, within the throughways 270, 272. The inducement of turbulent flow may additionally increase contact of the discharged matter with surfaces of the pillar structures. This increased contact may improve transfer of heat from the discharged matter to the lateral members 256, 258, thereby lowering a temperature of the discharged matter.

Figure 3A:
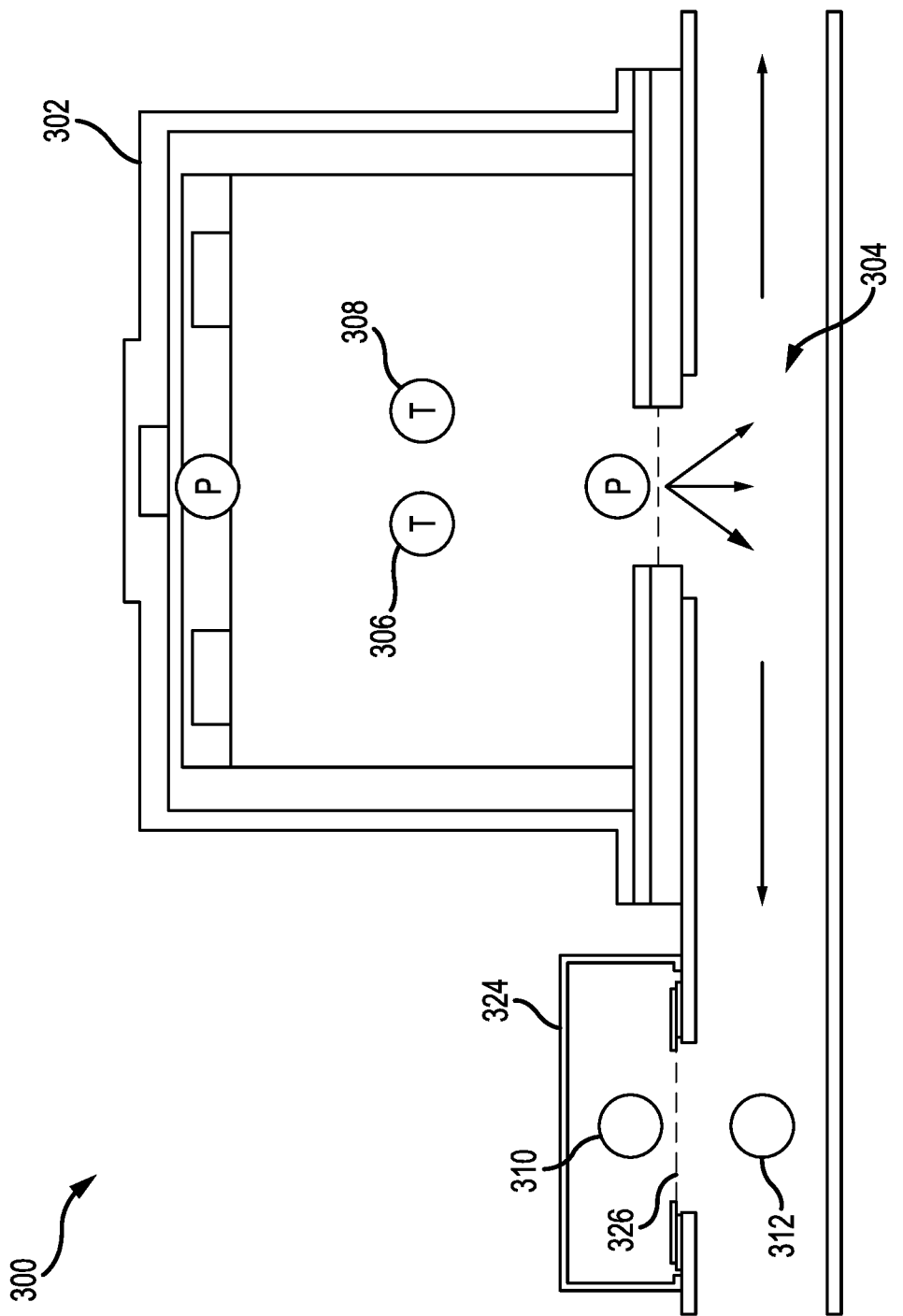
FIG. 3A is a schematic diagram of a testing apparatus that includes a cell block and a plenum chamber, in accordance with an illustrative embodiment.

Now referring to FIG. 3A, a schematic diagram is presented of a testing apparatus 300 that includes a cell block 302 and a plenum chamber 304, according to an illustrative embodiment. A plurality of thermocouples 306, 308, 310, and 312 is disposed in the cell block 302 and along a discharge path within the plenum chamber 304. The testing apparatus 300 is configured to measure temperatures that occur at different locations relative to cell block 302.

Figure 3B:
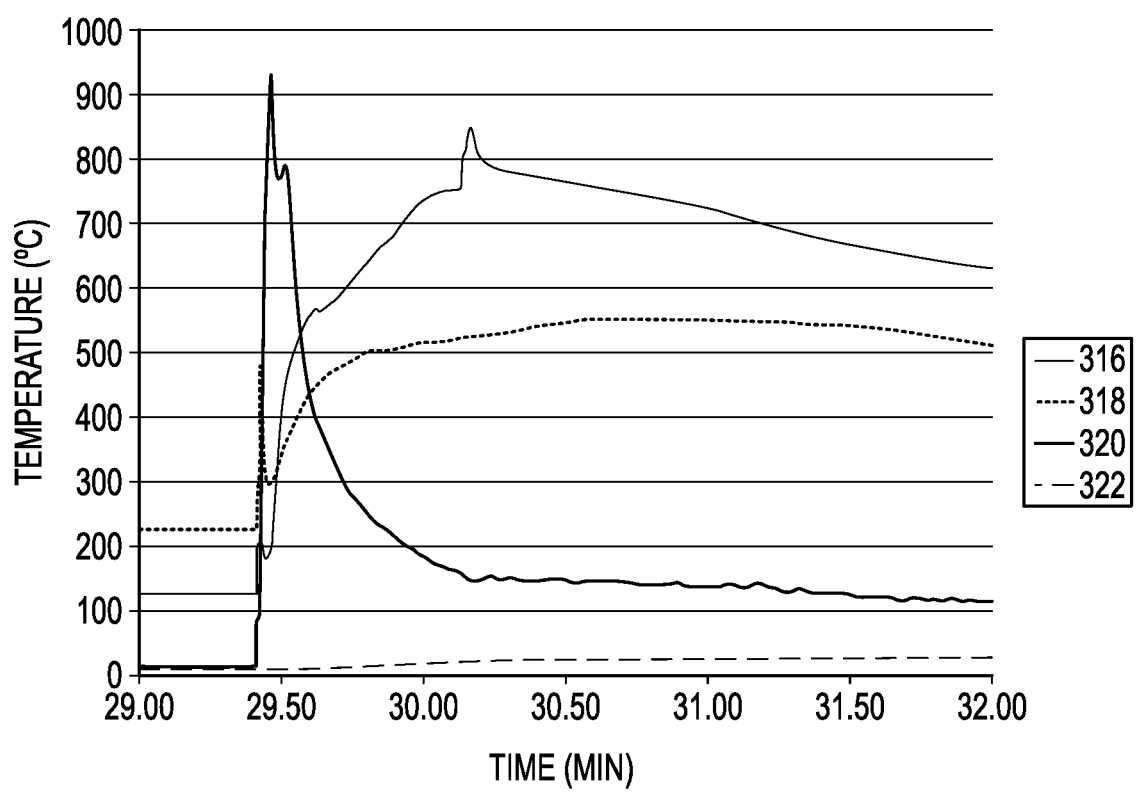
FIG. 3B is a graph of temperatures measured by the testing apparatus of FIG. 3A.

FIG. 3B presents a graph of temperatures 316, 318, 320, and 322 measured by the testing apparatus 300 during a representative thermal runaway event. The graph shows a dependence of the temperatures 316, 318, 320, and 322 with time. The temperatures of FIG. 3B include a first model cell block temperature 316, which is measured by a first thermocouple 306; a second model cell block temperature 318, which is measured by a second thermocouple 308; an exterior temperature 320 in the model plenum chamber 304 and adjacent a neighboring component 324, measured by a third thermocouple 310; and a neighboring temperature 320 inside the neighboring component 324. The temperatures in FIG. 3B further include a temperature at the entrance to neighboring component 326 of the neighboring component 324, measured by a fourth thermocouple 312. Entrance to neighboring component 326 models the location of a cell block vent 162 in FIG. 1C. Further, it will be appreciated that the neighboring component 324 in FIG. 3A models the location of second cell block 152 in FIG. 1C. Although FIG.

3A depicts thermal insulation around the cell block 302, this depiction is for purposes of illustration only.

Returning to FIG. 3A, temperatures 314 and 316 model internal temperatures of the cell block 302 that may occur as the result of a thermal runaway event. The exterior temperature 318, which is measured adjacent the neighboring component 324, increases rapidly after the thermal runaway event, but also decreases quickly (i.e., within minutes) to asymptotically approach a temperature of about 100° C. This behavior is different than first and second cell block temperatures 314, 316, which remain relatively high (i.e., above 500° C.). Neighboring temperature 320, however, increases only a small amount (i.e., stays below about 50° C.). It will be appreciated that the behavior of neighboring temperature 320 suggests a limited transfer of thermal energy into the neighboring component 324. Thus, the discharged matter has cooled sufficiently during expansion within the plenum chamber 304 that the neighboring component 324 does not reach temperatures capable of inducing a subsequent thermal runaway event (e.g., a thermal runaway event in a neighboring cell block). Moreover, the cell block vent 326 of the neighboring component 324, by virtue of its outward-flow configuration, has prevented the discharged matter from entering the neighboring component 324. In doing so, the cell block vent 326 has isolated the discharged matter to the plenum chamber 304, restricting it to cool therein and flow elsewhere.

Although FIGS. 1A-3B depict battery cells of a battery pack in the context of cell blocks and cell block vents, other configurations of battery cells are possible. However, as described below, the battery cells may be fluidly-coupled to a pack vent of the battery pack via respective cell vents.

Representative examples of such alternative embodiments are described in relation to FIGS. 4A-4D and 5A-5C. Moreover, in certain embodiments, the battery pack may have a plurality of pack vents.

Figure 4A:
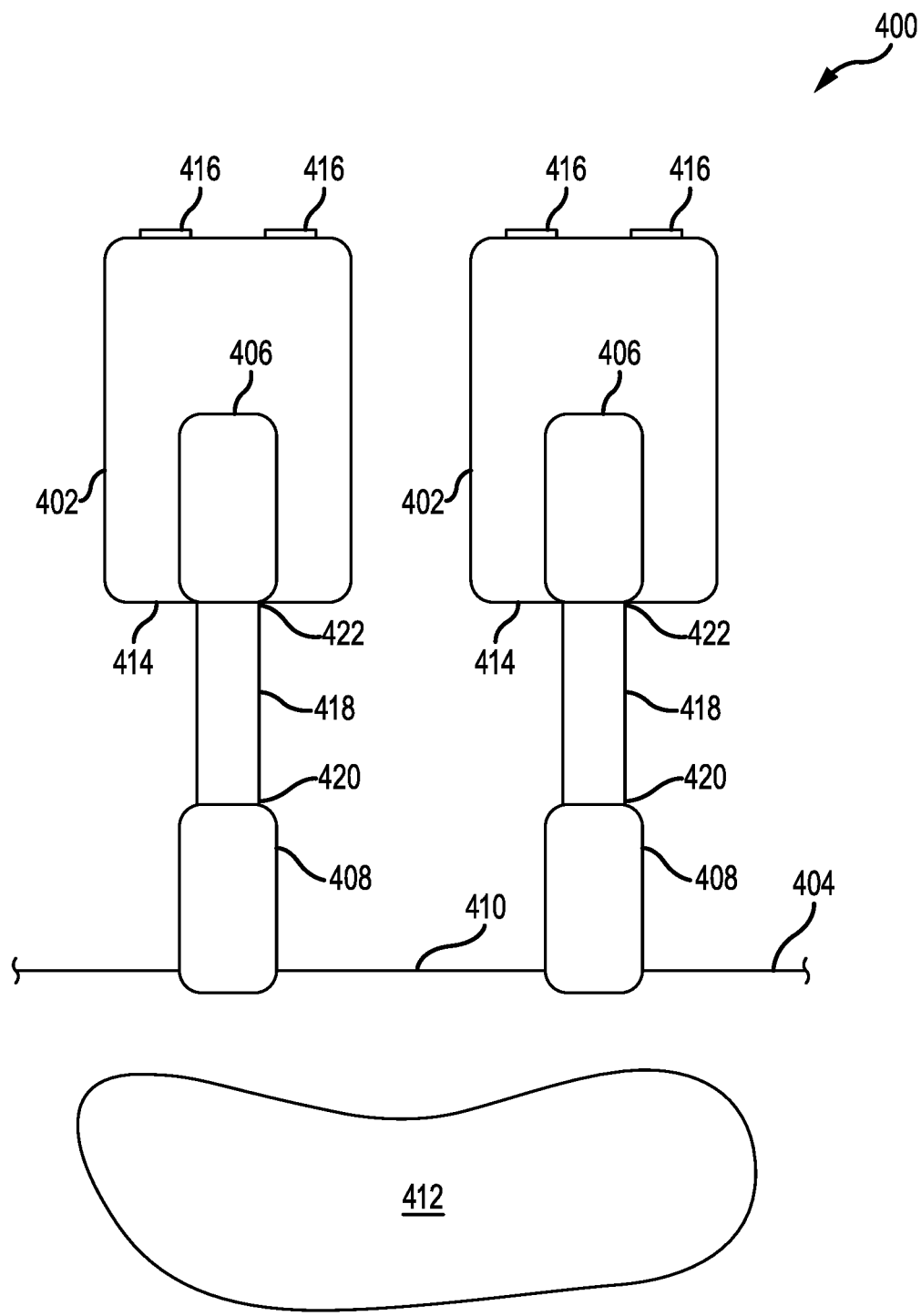
FIG. 4A illustrates a portion of a battery pack, in accordance with an illustrative embodiment.

FIG. 4A illustrates portions of a battery pack 400, according to an illustrative embodiment. The components of the battery pack 400 are arranged to control discharges of matter during thermal runaway. The battery pack 400 includes a battery pack structure 404. The battery pack 400 also includes a plurality of battery cells 402 disposed on the battery pack structure 404. Battery cells 402 each have a cell vent 406 operable to discharge matter during the thermal runaway event. The cell vent 406 is shaped and positioned to permit discharge of matter from within the battery cell 402 towards an exterior of the battery cell 402. Non-limiting examples of discharged matter include vapors, gases, char, electrolyte fluid, and solid matter (including solid battery materials). Other types of discharged matter are possible. The discharged matter may be in a combusted state, an uncombusted state, or some combination thereof.

The cell vent 406 may be incorporated in whole or in part into an enclosure of each battery cell. In FIG. 4A, the cell vent 406 is depicted as internal to its corresponding battery cell 402. However, this depiction is not intended as limiting. The cell vent 406 may have a portion external to the battery cell 402. In some embodiments, the cell vent 406 includes a passive occlusion (e.g., a frangible seal). In other embodiments, the cell vent 406 includes an active occlusion (e.g., a microprocessor-controlled valve).

The battery pack 400 also includes a pack vent 408 disposed on the battery pack structure 404 and fluidly-coupled to at least one of the cell vents 406. The pack vent 408 is shaped and positioned to permit discharged matter to pass from the at least one cell vent 406 (or multiples thereof) to an exterior 412 of the battery pack 400. In some embodiments, the pack vent 408 includes an orifice. The orifice may be directly exposed to the exterior 412 of the battery pack 400. In some embodiments, the pack vent 408 includes an occluding member for blocking or at least impeding a flow pathway through the pack vent 408 (e.g., a frangible seal, a plug, a valve, or similar component). The occluding member may be passive (e.g., a plug) or active (e.g., microprocessor-controlled). In further embodiments, the occluding member comprises thermal insulation.

The pack vent 408 may be incorporated in whole or in part within the wall 410 of the battery pack structure 404. FIG. 4A depicts a variation where the pack vent 408 has a portion protruding into the exterior 412 of the battery pack 400. However, this depiction is not intended as limiting. Other arrangements for the pack vent 408 are possible. Moreover, any number of pack vents 408 may be disposed within the wall 410. FIG. 4A illustrates a non-limiting variation where two pack vents 408 are disposed within the wall 410.

Fluid coupling between the pack vent 408 and the cell vent 406 (or multiples thereof) may involve structures and seals that operate at elevated temperatures and pressures (i.e., T>300° C. and P>500 kPa). Such structures and seals are configured to maintain mechanical integrity under vibrational loads and shocks from impact loads. The structures and seals may also be formed of materials chemically-resistant to discharged matter from the battery cell 402 (e.g., electrolyte vapors, particles of cathode active material, etc.). Embodiments of the structures and seals are described later in relation to FIGS. 4A-4D.

In some embodiments, such as that shown in FIG. 4A, the cell vent 406 is disposed on a side 414 different than that of a battery terminal 416 (e.g., an adjacent side, an opposite side, or a bottom side). In some embodiments, the battery pack 400 includes a plurality of pack vents 408 disposed within the wall 410 of the battery pack structure 404.

In some embodiments, the cell vents 406 include a cell vent having a flow guide configured to alter a direction of discharged matter passing through the flow guide. In some embodiments, the pack vent 408 includes a flow guide configured to alter a direction of discharged matter passing through the pack vent 408. Non-limiting examples of the flow guide include a nozzle and a louver.

In some embodiments, the occluding member is configured to allow discharged matter to flow from the cell vent 406 (or multiples thereof) to the exterior 412 of the battery pack structure 404. However, in these embodiments, the occluding member is also configured to block or at least impede discharged matter from flowing from the exterior 412 of the battery pack structure 404 towards the cell vent 406 (or multiples thereof). This configuration may prevent discharged matter (i.e., from an unstable battery cell) from breaching one or more pack vents 408 to interact with neighboring battery cells. The configuration may also be beneficial in avoiding thermal contagion within a battery pack 400.

In some embodiments, the cell vents 406 include a cell vent having a back-flow prevention mechanism. The back-flow prevention mechanism is configured to block or at least impede discharged matter from entering a battery cell through its cell vent and permit discharge of matter from within the battery cell towards the exterior of the battery cell during the thermal runaway event.

In some embodiments, the cell vents 406 comprise a cell vent having an occluding member for blocking or at least impeding a flow pathway through the cell vent. The occluding member includes thermal insulation configured to melt at a temperature experienced during the thermal runaway event.

In some embodiments, the pack vent 408 includes a back-flow prevention mechanism. The back-flow prevention mechanism is configured to block or at least impede matter from entering the battery pack structure 404 through the pack vent 408 and permit discharge of matter from the plurality of battery cells 402 towards the exterior of the battery pack 412 during the thermal runaway event.

In some embodiments, the pack vent 408 includes an occluding member for blocking or at least impeding a flow pathway through the pack vent 408. The occluding member includes thermal insulation configured to melt at a temperature experienced during the thermal runaway event.

During operation of the battery pack 400, the plurality of battery cells 402 receive electrical energy from a source to charge and supply electrical energy to a sink to discharge. However, during operation one or more battery cells 402 may become less stable, e.g., electrochemical reactions in the one or more battery cells 402 may accelerate. As a result, the one or more battery cells 402 may generate heat at rates outside of a tolerance of the one or more battery cells 402. If not dissipated, this heat can catalyze thermal runaway, quickly elevating internal temperatures and pressures within the one or more battery cells 402.

It will be appreciated that the battery pack 400 is configured to allow less stable battery cells 402 to discharge hot, pressurized matter into a controlled volume, which is bounded by the cell vent 406, the pack vent 408, and fluid-coupling therebetween. The controlled volume is operable to prevent discharged matter from interacting with neighboring battery cells 402 (e.g., interacting thermally, mechanically, chemically, etc.).

During thermal runaway, the cell vent 406 opens to allow matter to discharge from a corresponding battery cell 402. The cell vent 406 may open in response to a threshold being exceeded, such as a predetermined temperature or a predetermined pressure. The discharged matter, by virtue of fluid-coupling between the cell vent 406 and the pack vent 408, enters the pack vent 408 to traverse the wall 410 of the housing 404 (i.e., to reach the exterior 412). The optional flow guide, if present, may guide the direction of discharged matter into the exterior 412.

In some embodiments, such as that depicted in FIG. 4A, the battery pack 400 includes the plurality of pack vents 408 disposed with the wall 410 of the housing 404 and a conduit 418 fluidly-coupling a pack vent 408 to a cell vent 406. In these embodiments, discharges of matter from a single battery cell are separated from other battery cells. The conduit 418 may include a first end 420 sealed to a pack vent 408 and a second end 422 sealed to a cell vent 406. The conduit 418 and seals involve materials resistant to elevated temperatures and pressures (i.e., T>300° C. and P>500 kPa). In some instances, the seals can be a gasket, a sealing compound, a polymeric O-ring, a mechanical interference fit, or combinations thereof. In some instances, the conduit 418 includes thermal insulation (e.g., alumina insulation tape, fibrous silica felt, a polyurethane coating, etc.).

In some instances, the conduit 418 may be formed of a metal material (e.g., be a metal tube). Non-limiting examples of metal for the conduit 418 include aluminum and aluminum-based alloys; iron and iron-based alloys (e.g., steel and stainless steel); nickel and nickel-based alloys; titanium and titanium-based alloys; and zirconium and zirconium-based alloys. Other metals are possible. In some instances, the metal has a melting point greater than 1000° C. In some instances, the metal has a melting point greater than 1300° C. In some instances, the metal has a melting point greater than 1600° C. In some instances, the metal has a thermal conductivity lower than 160 W/m·K. In some instances, the metal has a thermal conductivity lower than 120 W/m·K. In some instances, the metal has a thermal conductivity lower than 80 W/m·K.

In other embodiments, the conduit 418 may be formed of a ceramic material, such as alumina, fused quartz, zirconia, mullite, and so forth. In these instances, the conduit 418 may also include a reinforcing structure selected from the group consisting of an inner pipe, an outer pipe, a coating, or combinations thereof. The inner pipe and the outer pipe may be formed of metal material, or alternatively, a plastic material (e.g., a polyetherketone material, a polyphenylene styrene material, a polyurethane material, etc.). Non-limiting examples of the coating include sprayed-on coatings, dip coatings, painted coatings, and laminates (e.g., laminated layers and fibers). Other coating types are possible. In some instances, the coating includes ceramic filler particles (e.g., filler particles of alumina, zirconia, silica, silicon nitride, mullite, etc.). In some instances, the coating is operable to seal the conduit 418 to the pack vent 408 and the cell vent 406.

Although FIG. 4A depicts the battery pack 400 with a one-to-one coupling of pack vents 408 to the cell vents 406, this depiction is for purposes of illustration only. Other types of couplings are possible.

Figure 4B:
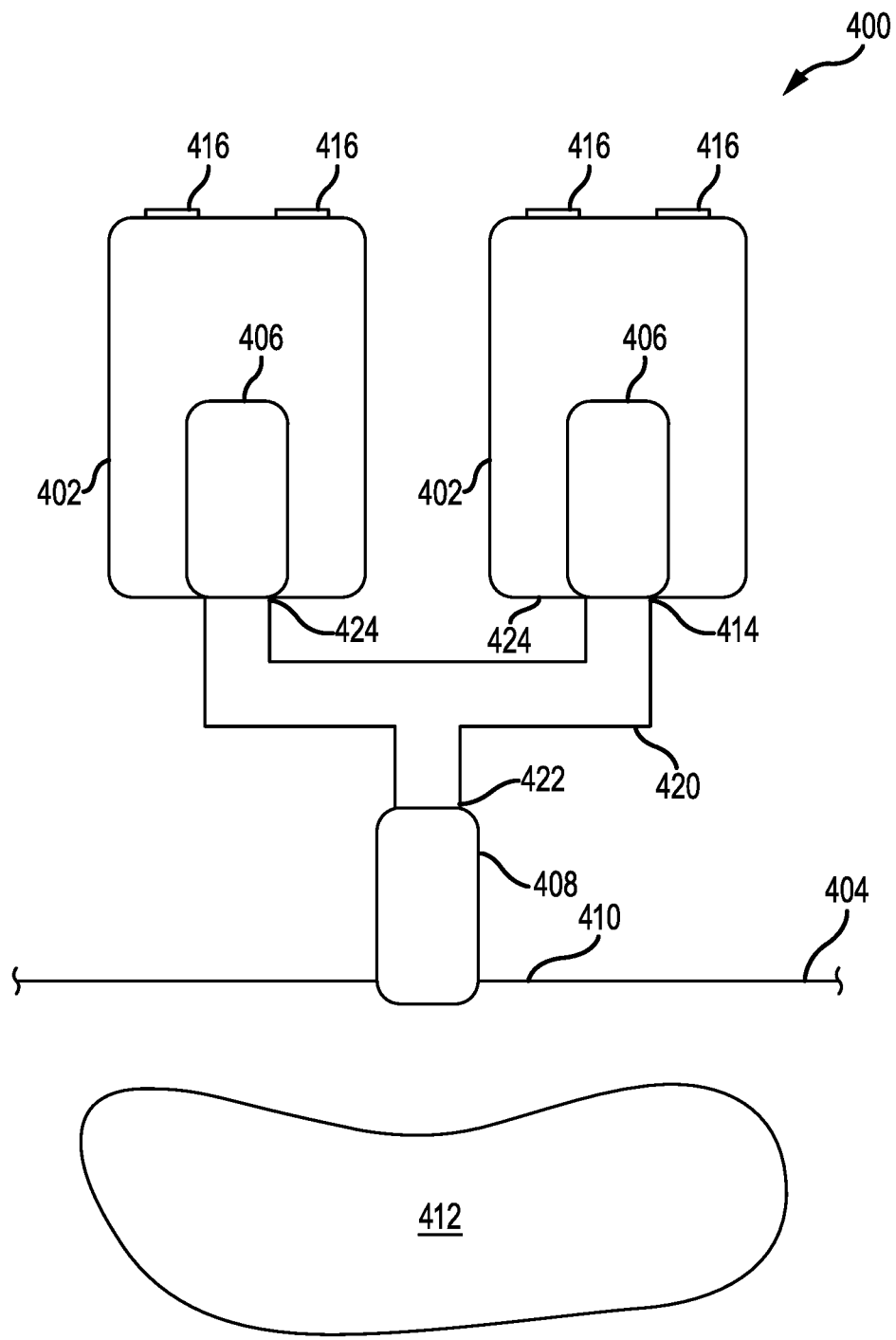
FIG. 4B illustrates a portion of a battery pack, in accordance with an illustrative embodiment.

FIG. 4B illustrates portions of a battery pack 400, in accordance with an illustrative embodiment. In these embodiments, a manifold 420 fluidly-couples one pack vent 408 to two or more cell vents 406. The manifold 420 may include an outtake port 422 sealed to a pack vent 408 and a plurality of intake ports 424, each sealed to one cell vent 406. The manifold 420 and seals involve materials resistant to elevated temperatures and pressures (i.e., T>300° C. and P>500 kPa). In these embodiments, discharges of matter from one or more battery cells 402 within a group are separated from other battery cells. In FIG. 4B, the manifold 420 is depicted as fluidly-coupling one pack vent 408 to two cell vents 406. However, this depiction is not intended as limiting. The manifold 420 may fluidly-couple any plurality of cell vents 406 to the pack vent 408. In some instances, the seals include a gasket, a sealing compound, a polymeric O-ring, a mechanical interference fit, or combinations thereof. In some instances, the manifold 420 includes thermal insulation (e.g., alumina insulation tape, fibrous silica felt, a polyurethane coating, etc.).

In some instances, the manifold 420 may be formed of a metal material (e.g., be a metal tube). Non-limiting examples of metal for the manifold 420 include aluminum and aluminum-based alloys; iron and iron-based alloys (e.g., steel and stainless steel); nickel and nickel-based alloys; titanium and titanium-based alloys; and zirconium and zirconium-based alloys. Other metals are possible. In some instances, the metal has a melting point greater than 1000° C. In some instances, the metal has a melting point greater than 1300° C. In some instances, the metal has a melting point greater than 1600° C. In some instances, the metal has a thermal conductivity lower than 160 W/m·K. In some instances, the metal has a thermal conductivity lower than 120 W/m·K. In some instances, the metal has a thermal conductivity lower than 80 W/m·K.

The manifold 420 may also be formed of a ceramic material, such as alumina, fused quartz, zirconia, mullite, and so forth. In these instances, the manifold 420 may include at least one reinforcing structure selected from the group consisting of an inner pipe, an outer pipe, a coating, or combinations thereof. The inner pipe and the outer pipe may be formed of a metal material, or alternatively, a plastic material (e.g., a polyetherketone material, a polyphenylene styrene material, a polyurethane material, etc.). Non-limiting examples of the coating include sprayed-on coatings, dip coatings, painted coatings, and laminates (e.g., laminated layers and fibers). Other coating types are possible. In some instances, the coating includes ceramic filler particles (e.g., filler particles of alumina, zirconia, silica, silicon nitride, mullite, etc.). In some instances, the coating is operable to seal the manifold 420 to a pack vent 408 and two or more corresponding cell vents 406.

Although FIGS. 4A & 4B depict the cell vents 406 as being displaced away from the pack vent 408, this depiction is not intended as limiting. The cell vents 406 may be disposed adjacent the pack vent 408.

Figure 4C:
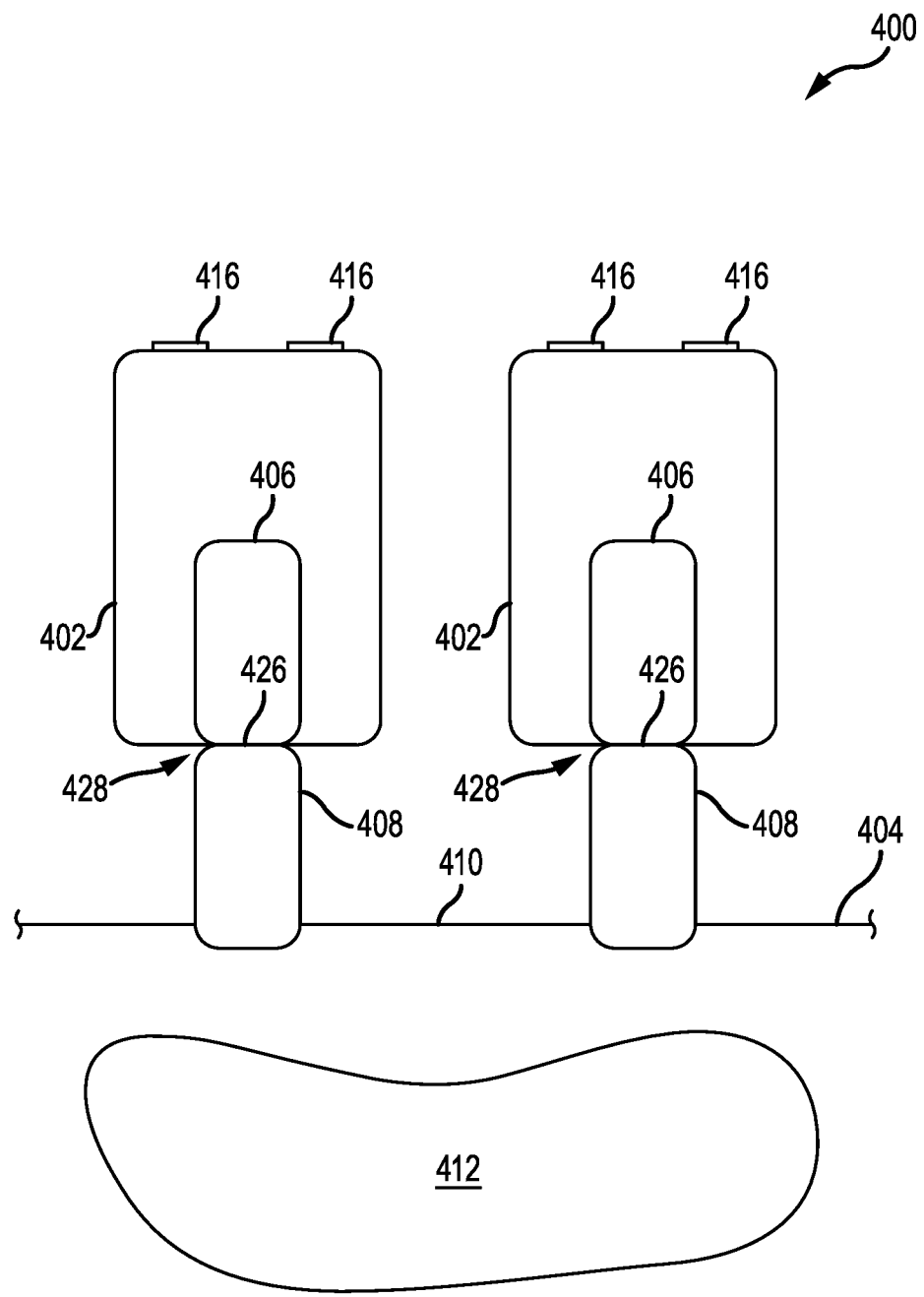
FIG. 4C illustrates a portion of a battery pack, in accordance with an illustrative embodiment.

FIG. 4C illustrates a portion of a battery pack 400 in some embodiments. In these embodiments, the cell vents 406 are coupled directly to pack vents 408 via a seal 426. The battery pack 400 includes the plurality of pack vents 408 disposed within the wall 410 of the battery pack structure 404. Each pack vent 408 is fluidly-coupled to a cell vent 406 and has an interface 428 therewith. The seal 426 is disposed along the interface 428. The seal 426 may include a gasket, a sealing compound, a polymeric O-ring, a mechanical interference fit, or combinations thereof. In these embodiments, discharges of matter from a single battery cell are separated from other battery cells. In some instances, each of the plurality of pack vents 408 is configured such that one cell vent 406 is nested therein. In these instances, such nesting may improve a delivery of discharged matter into each of the plurality of pack vents 408.

Although FIGS. 4A-4C illustrate cell vents 406 and pack vents 408 as being distinct structures, in some embodiments, cell vents 406 and pack vents 408 may be integrated into a unified structural element. Such integration may involve any number and combination of cell vents 406 and pack vents 408.

Figure 4D:
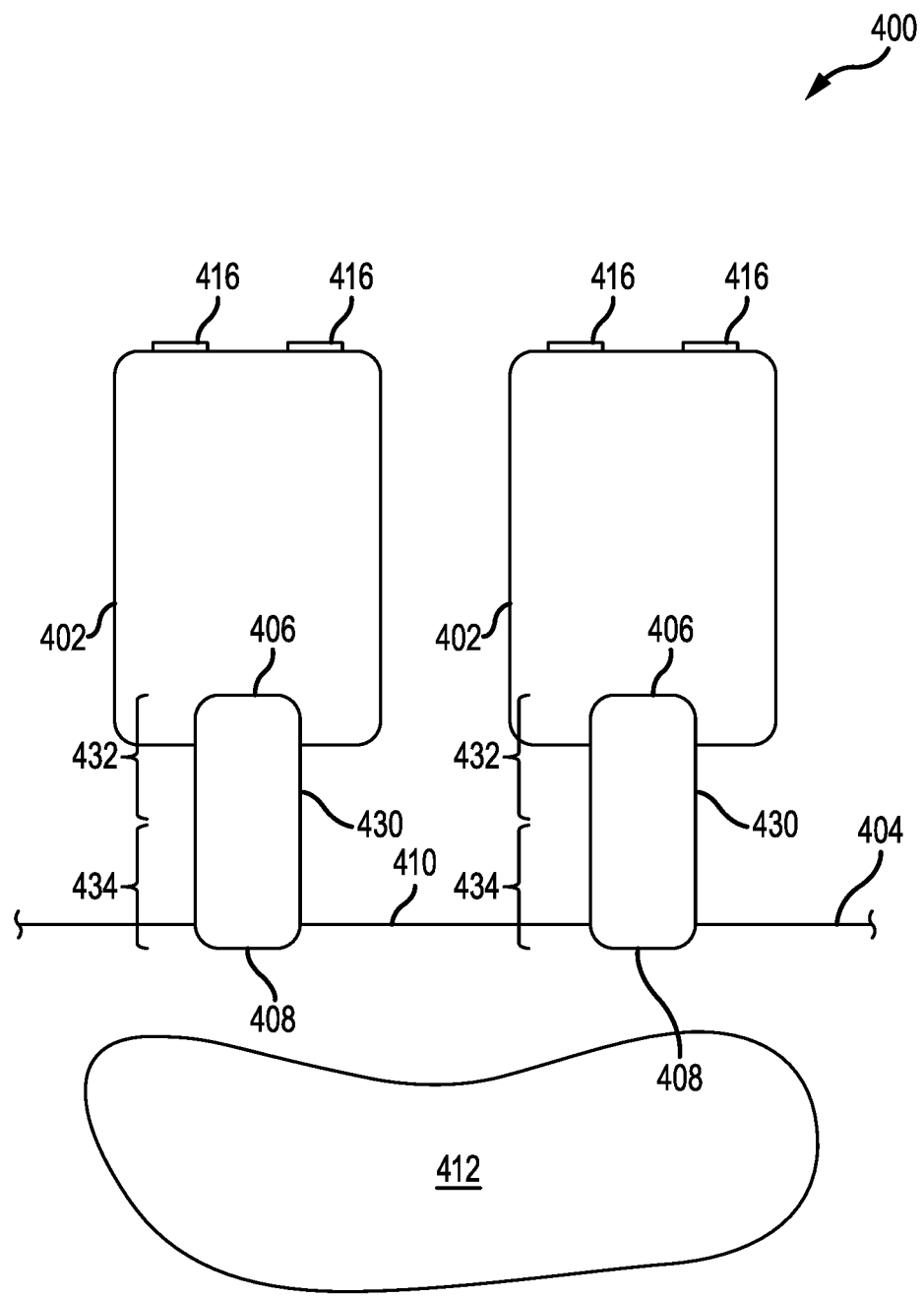
FIG. 4D illustrates a portion of a battery pack, in accordance with an illustrative embodiment.

FIG. 4D illustrates a portion of a battery pack 400 in some embodiments. In these embodiments, the cell vents 406 and the pack vents 408 serve as portions of an integrated vent 430. The battery pack 400 includes the plurality of pack vents 408 disposed within the wall 410 of the battery pack structure 404. The integrated vent 430 has a first portion 432 and a second portion 434. The first portion 432 includes a cell vent 406 and the second portion 434 includes a pack vent 408. In these embodiments, discharges of matter from a single battery cell are separated from other battery cells.

In some instances, the integrated vent 430 may be formed of a metal material (e.g., be a metal tube). Non-limiting examples of metal for the conduit 418 include aluminum and aluminum-based alloys; iron and iron-based alloys (e.g., steel and stainless steel); nickel and nickel-based alloys; titanium and titanium-based alloys; and zirconium and zirconium-based alloys. Other metals are possible. In some instances, the metal has a melting point greater than 1000° C. In some instances, the metal has a melting point greater than 1300° C. In some instances, the metal has a melting point greater than 1600° C. In some instances, the metal has a thermal conductivity lower than 160 W/m·K. In some instances, the metal has a thermal conductivity lower than 120 W/m·K. In some instances, the metal has a thermal conductivity lower than 80 W/m·K.

The integrated vent 430 may also be formed of a ceramic material, such as alumina, fused quartz, zirconia, mullite, and so forth. In these instances, the integrated vent 430 may include a reinforcing structure selected from the group consisting of an inner pipe, an outer pipe, a coating, or combinations thereof. The inner pipe and the outer pipe may be formed of metal material, or alternatively, a plastic material (e.g., a polyetherketone material, a polyphenylene styrene material, a polyurethane material, etc.). Non-limiting examples of the coating include sprayed-on coatings, dip coatings, painted coatings, and laminates (e.g., laminated layers and fibers). Other coating types are possible. In some instances, the coating includes ceramic filler particles (e.g., filler particles of alumina, zirconia, silica, silicon nitride, mullite, etc.). In some instances, the coating is operable to seal the integrated vent 430 to the wall 410 and one battery cell 402.

Although FIGS. 4A-4D illustrate representative portions of the battery pack 400, it will be appreciated that, in general, such portions can be incorporated in any number and combination within the battery pack 400. Moreover, in certain embodiments, the battery pack 400 may further include a plenum chamber fluidly-coupled to one or more cell vents of the battery cells. As described below, the plenum chamber may have a plenum vent that functions analogous to a pack vent for the battery pack 400. The plenum chamber may also have one or more flow guides disposed therein to direct matter discharged from a battery cell during a thermal runaway event.

Figure 5A:
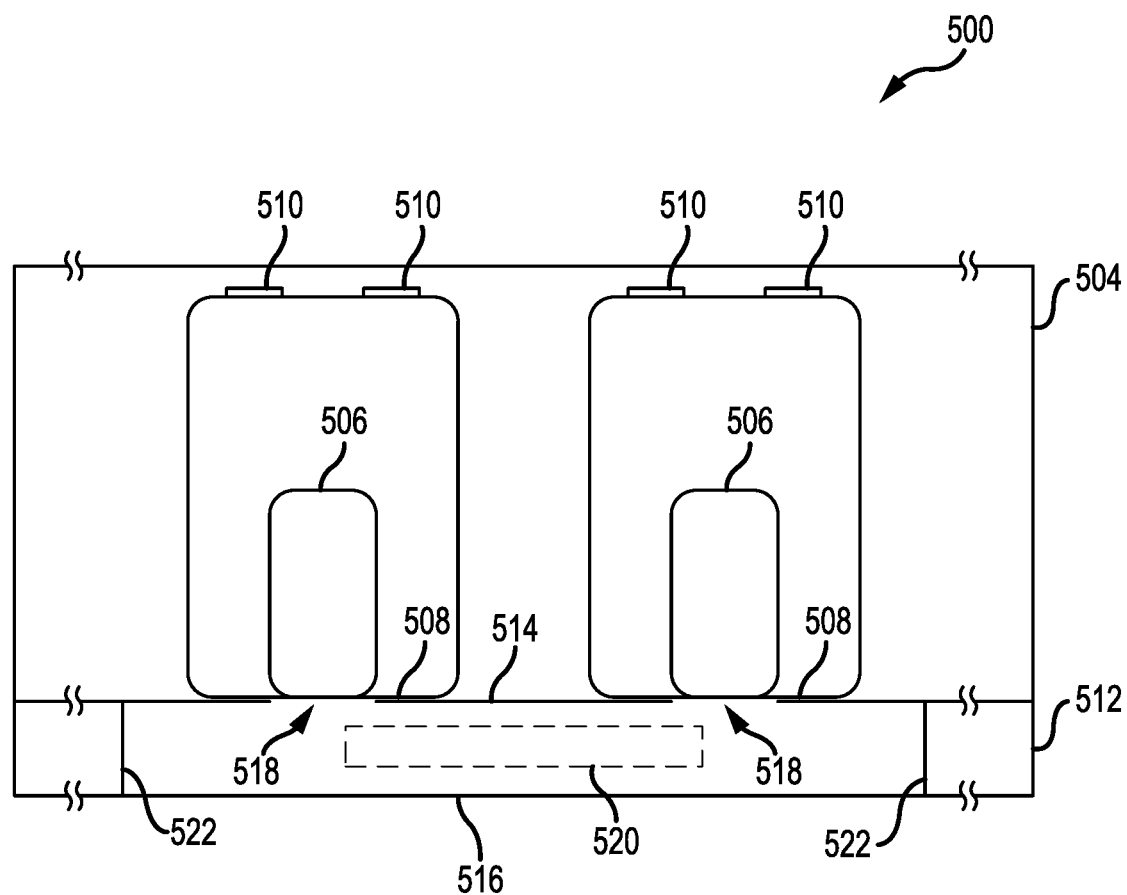
FIG. 5A is a schematic cross-section diagram of a system for directing discharged matter from battery cells, in accordance with an illustrative embodiment.

Now referring to FIG. 5A, a schematic cross-section diagram is presented of a system 500 for directing discharged matter from battery cells, in accordance with an illustrative embodiment. For clarity, only a portion of the system 500 is shown. The system 500 includes a battery pack structure 504. The system 500 also includes a plurality of battery cells 502 disposed on the battery pack structure 504. Each battery cell 502 has a cell vent 506 that is shaped and positioned to permit discharges of matter from within the battery cell 502 towards an exterior of the battery cell 502 during a thermal runaway event. The battery cell 502 and the cell vent 506 may be analogous to that described in relation to FIGS. 5A-5D. In some embodiments, the cell vent 506 is disposed on a side 508 different than that of a battery terminal 510.

The system 500 additionally includes a plate structure 512 coupled with the battery pack structure 504 to form a plenum chamber. The plate structure 512 includes at least one flow guide 522 and at least one occluding member (see also FIGS. 5B & 5C). The at least one flow guide 522 and the at least one occluding member operate, during the thermal runaway event, to facilitate flow of vapor released from the cell vents 506 towards a plenum vent 520 to an external ambient environment and impede flow of solid battery material discharged from the cell vents 506 towards the plenum vent 520.

In some embodiments, the plate structure 512 has a first plate 514 disposed opposite a second plate 516. The first plate 514 has a plurality of openings 518 disposed therein. The plurality of openings 518 may have any number, shape, and arrangement within the first plate 514. The plurality of openings 518 is fluidly-coupled to cell vents 506 of the plurality of battery cells 502. Such fluid coupling may involve one or more seals selected from the group consisting of a gasket, a sealing compound, a polymeric O-ring, a mechanical interference fit, or combinations thereof. The seals may involve materials resistant to elevated temperatures and pressures (i.e., T>300° C. and P>500 kPa). In some embodiments, such as that shown in FIG. 5A, each of the plurality of openings 518 is fluidly-coupled to one cell vent 506.

The plenum vent 520 is disposed on the plate structure 512 and fluidly-coupled to the plurality of openings 518. The plenum vent 520 may include a nozzle, a louver, or both, to direct discharged matter exiting the plate structure 512. In some instances, such as that shown in FIG. 5A, the plenum vent 520 is disposed in a side of the plate structure 512. In other instances, the plenum vent 520 is disposed in the second plate 516. Although FIG. 5A depicts only one plenum vent 520, this depiction is not intended as limiting. Multiple plenum vents 520 are possible, including any shape and arrangement of plenum vents 520 in the plate structure 512.

Figure 5B:
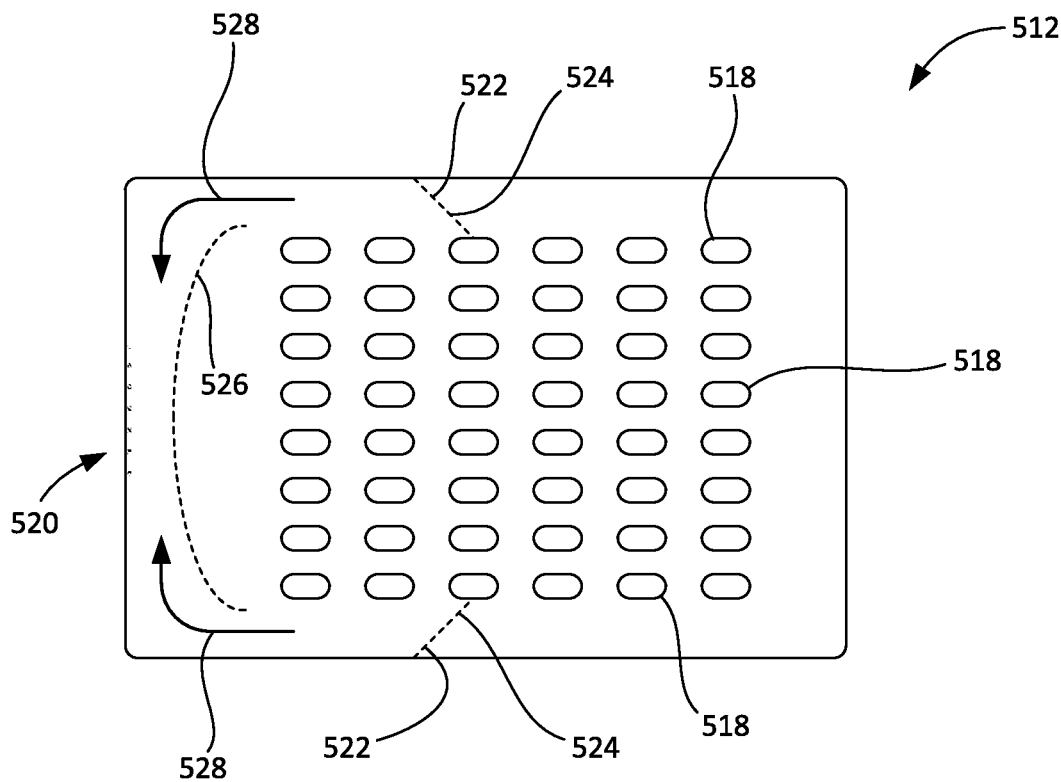
FIG. 5B is a top view of a plate structure described with reference to FIG. 5A, in accordance with an illustrative embodiment.
Figure 5C:
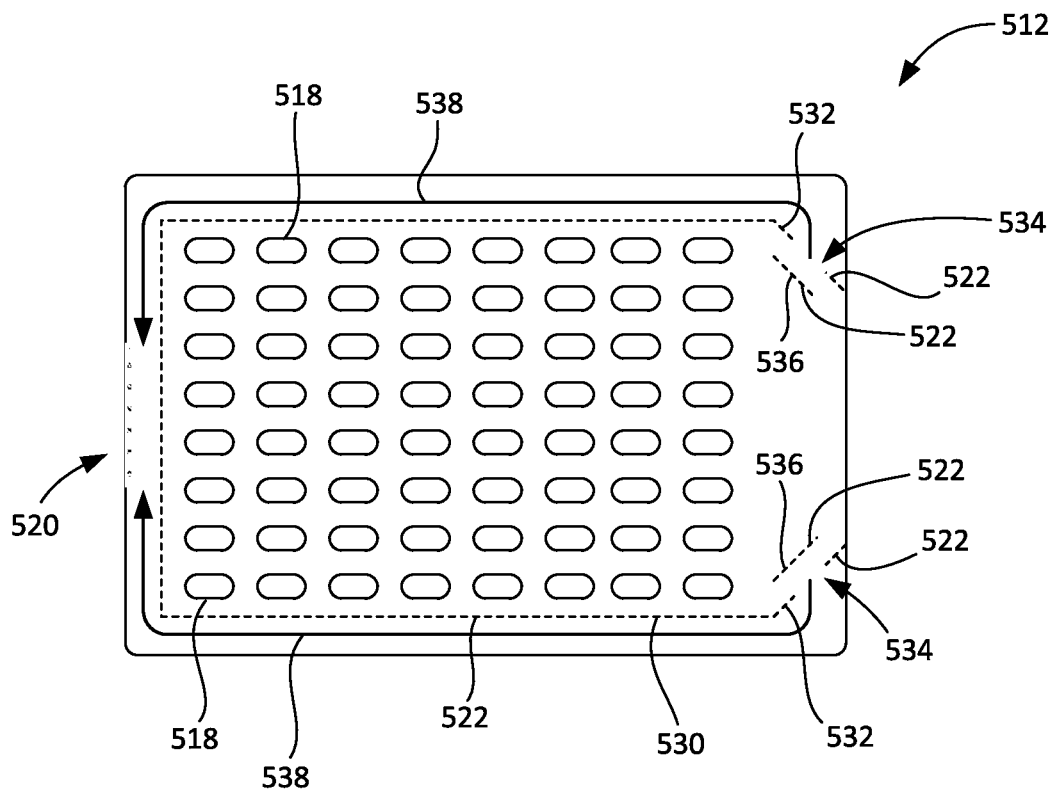
FIG. 5C is a top view of a plate structure described with reference to FIG. 5A, in accordance with an illustrative embodiment.

The at least one flow guide 522 may be disposed between the first plate 514 and the second plate 516 (e.g., see also FIGS. 5B & 5C). The flow guide 522 may be operable to establish a tortuous pathway for matter discharged into the plate structure 512. The tortuous pathway may allow hot particles and gasses to be separated via inertia while flowing through the plate structure 512. Such separation may prevent ignition of the discharged matter outside the plate structure 512 (e.g., if combustible constituents are present in the discharged matter). In some embodiments, the at least one flow guide 522 is arranged to direct discharged matter along a flow path having a turn of at least 90°. The flow path may extend from one or more openings 518 to the plenum vent 520. In some embodiments, the plate structure 512 includes a screen disposed therein. In these embodiments, the screen may capture hot particles from the discharged matter, thereby retaining such particles within the plate structure 512.

FIGS. 5B and 5C present top views of embodiments of the plate structure 512 illustrated in FIG. 5A. In FIG. 5B, angled baffles 524 extend from side walls of the plate structure 512 to supplement an arcuate wall 526 disposed adjacent the plenum vent 520. The angled baffles 524 and the arcuate wall 526 represent flow guides 522 and help to define a flow path 528 having a turn of at least 90°. For clarity, only a portion of the flow path 528 is shown in FIG. 5B. In FIG. 5C, a rectangular wall 530 is disposed within the plate structure 512 to enclose flow paths emanating from the plurality of openings 518. The rectangular wall 530 merges into the plate structure 512 via tapers 532 having vents 534. Flow through the vents 534 is impeded by baffles 536 disposed proximate the vents 534. The rectangular wall 530, tapers 532, and baffles 536 represent flow guides 522 and help to define a flow path 538 having multiple turns of at least 90°. For clarity, only a portion of the flow path 538 is shown in FIG. 5C.

During operation of the system 500, one or more battery cells 502 may experience thermal runaway, causing corresponding cell vents 506 to open and discharge matter through respective openings 518. Matter so-discharged enters the plate structure 512 (i.e., the plenum chamber) and flows along a flow path bounded by the at least one flow guide 522. The flow path extends from one or more openings 518 to the plenum vent 520. In some instances, the flow path is tortuous and may optionally include the screen. Tortuous flow may separate particles from gasses in the discharged matter via inertial separation. The screen, if present, may assist in separating such particles mechanically. Separation of the particles may reduce a risk of ignition outside of the plate structure 512.

Because discharges from less stable battery cells 502 may occur at elevated temperatures and pressures (i.e., T>300° C. and P>500 kPa), interaction of discharged matter with the plurality of battery cells 502 is undesirable (i.e., interaction thermally, mechanically, chemically, etc.). The plate structure 512 represents a segregated volume capable of receiving such discharged matter and keeping this matter away from the plurality of battery cells 502. Moreover, the plate structure 512 may allow discharged matter to cool and depressurize, thereby reducing a tendency of such matter to ignite upon exiting the plate structure 512.

Figure 6:
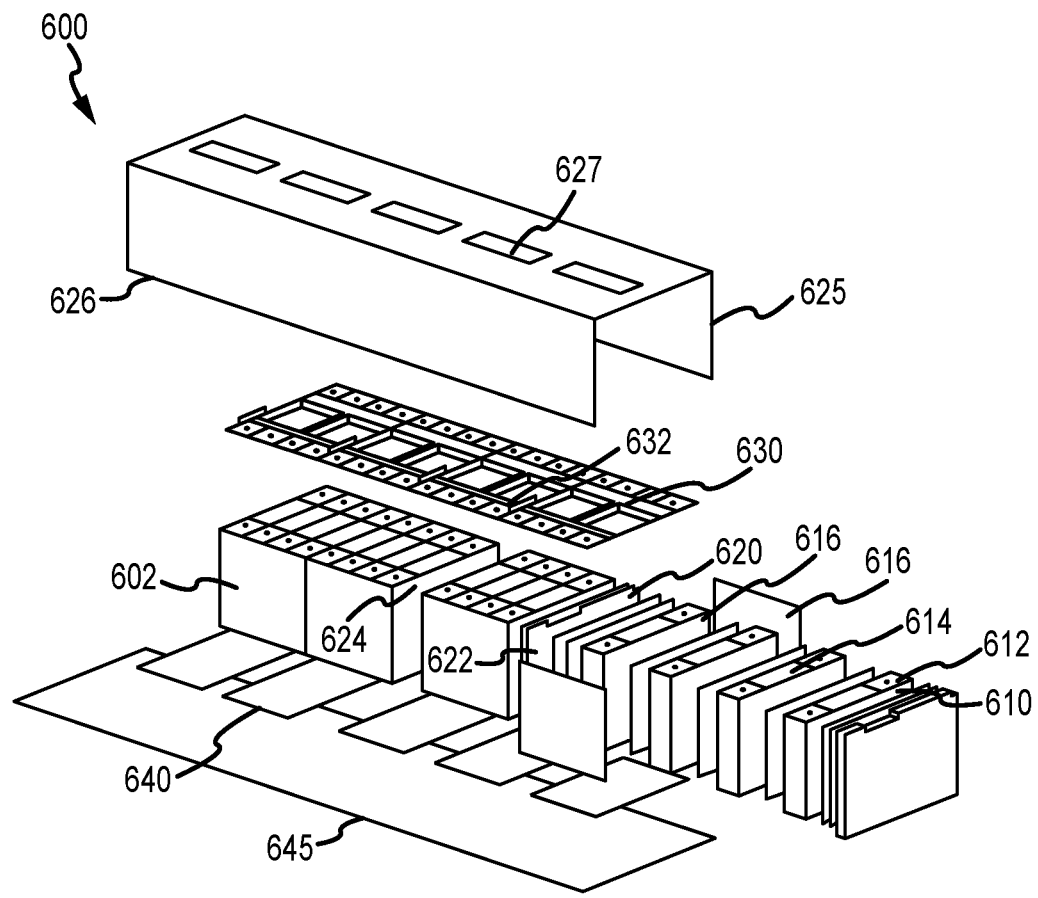
FIG. 6 illustrates an exploded view of an exemplary battery module, in accordance with an illustrative embodiment.

Turning to FIG. 6 is illustrated an exploded perspective view of a battery module 600 according to embodiments of the present technology. Battery module 600 may be one of a number of battery modules that may be included within a battery pack, as previously described. Battery module 600 is illustrated in an inverted position from previous figures for ease of description. The battery module 600 may include a number of battery cell blocks 602, which each include one or more battery cells 610. As illustrated, each cell block 602 includes four individual battery cells 610, although it is to be understood that embodiments may include any number of battery cells per battery cell block, such as at least about two cells, at least about four cells, at least about six cells, or more. Additionally, the battery module 600 may include any number of battery cell blocks within the module based on length of the module, which may be based on one of several lateral dimensions of a battery pack.

Battery cells 610 may be similar to one another or may be different across the cell blocks and module. In embodiments, each battery cell 610 may be a similar battery cell as each other battery cell. Battery cells 610 may be or include prismatic cells, pouch cells, or any number of other battery cell designs. As previously noted, FIG. 6A may illustrate an inverted view of battery module 600, and may illustrate a bottom or base surface of battery cells 610. As shown, a surface of each battery cell 610, which may include a bottom surface, may include terminals 612 as well as a cell vent 614 in embodiments.

Each cell block 602 may include a number of battery cells coupled with one another, such as with adhesive, to limit spacing between battery cells. Thermal insulation 616 may be positioned on sides surrounding each cell block 602. Thermal insulation 616 may provide multiple benefits within a battery module. For example, thermal insulation about the sides of each cell block may limit thermal conductivity from one cell block to another. Additionally, thermal insulation 616 may be or include a compressive material to provide accommodation space within each cell block.

As battery cells are cycled during their life, the cells may swell over time. When cells are rigidly compressed or contained within a particular structure, the cells may have reduced cycle life. The present technology, however, may include thermal insulation configured to provide an amount of deflection or compression to accommodate swelling of battery cells over time. The thermal insulation 616 may be configured to fully occupy space within each cell block to limit any gaps within the block. However, the thermal insulation material may be configured to accommodate compression of up to or about 50% or more of its thickness to accommodate battery swelling over time. Unlike conventional technology that may not provide such accommodation, the present technology may produce longer battery life cycles based on the incorporated accommodation of battery swelling within each cell block.

Opposite ends of each cell block 602 in an axial direction of battery module 600 may include a bulkhead 620. Bulkhead 620 may be a rigid member separating each cell block 602 from an adjacent cell block. Bulkhead 620 may be aluminum, steel, ceramic, plastic, or any number of other materials to separate cell blocks or contain cell blocks. Bulkheads 620 may include a flange 622, which may facilitate coupling of the bulkhead 620 with a sleeve or shroud 625. Shroud 625 may extend over a number of sides of each cell block 602. For example, shroud 625 may extend about sides and a bottom of each cell block in embodiments. Shroud 625 may define or include cell block vents 627, which may be any of the cell block vents previously described. Shroud 625 may include a cell block vent 627 for each cell block included in module 600, or may include more or fewer vents as there are cell blocks.

Shroud 625 may be welded, bonded, glued, fastened, or otherwise coupled with bulkheads 620 on sides of the module. Flanges 622 of bulkheads 620 may extend as an end joint on the bulkheads 620. The flange may extend back towards the bulkheads 620 in a 180 degree rounded turn, which may provide protection for a weld. During certain welding operations coupling the shroud 625 with the flanges 622 of each bulkhead 620, sputtering may occur through the backside of the flange. By having the flange double back on itself, any sputtering may be contained within a loop formed by the flange. This may limit or prevent any sputtered material from contacting any cells of the cell block. Bulkheads 620 and shroud 625 may provide structural rigidity to the module 600, which may limit vibration effects on the cell blocks 602.

Bulkheads 620 may also define a recess 624 along a surface of the bulkhead 620 in line with terminals 612 of the battery cells 610. Cell blocks 602 may be joined together with bus bars 630, 632 in embodiments. Bus bars 630 may be intra-cell block bus bars that electrically couple individual cells of each cell block 602. Bus bars 632 may be inter-cell block bus bars that couple adjacent cell blocks of the modules. Recess 624, which may be a notch defined in the bulkhead 620, may provide access for bus bars 632 to extend from one cell block to another.

Bus bars 630, 632 may be seated in a tray positioned between cell blocks 602 and shroud 625. Tray 635 may include features to seat the bus bars to ensure proper spacing between cell blocks, and also to electrically insulate the various structures. Bus bar tray 635 may define one or more channels or apertures through the bus bar tray to allow egress of material from cell vents within each battery cell 610. For example, for battery cells including a centrally located cell vent, bus bar tray 635 may include a central channel to provide access to the cell block vents 627 from the cell vents 614.

A thermal interface material 640 may be coupled or placed along a surface of each cell block opposite a surface facing cell block vents 627 of shroud 625. The thermal interface material 640 may be configured to conduct or transfer heat generated from battery cells 610 through a top of the battery module 600. Thermal interface material may be included in individual sheets that may be placed on a surface of each cell block and may be sized relative to a cell block size, or a length of thermal interface material may be positioned along an axial length of battery module 600.

Battery module 600 may also include a top cover 645, which may provide a lid to the battery module 600. Shroud 625 may include a lip or flange 626 on either or both sides of the structure to provide a coupling location for top cover 645. Additionally, flange 626 may be used to seat battery module 600 on lateral members such as previously described, when battery module 600 is inverted and positioned within a battery pack. By seating on a top portion of lateral members, a bottom of shroud 625 and a bottom plate, such as plate structure 114 previously described, may define a volume for plenum chambers between adjacent lateral members.

Top cover 645 and shroud 625 may be a rigid material in embodiments, and may be aluminum, steel, or some other structural material configured to house and contain cell blocks of a battery module. The top cover and shroud may be configured to control an internal volume of the battery module to limit or prevent egress from the battery module except through cell block vents 627, which may lead into plenum channels previously described. By providing a rigid structure to control material egress, mitigation of effluent materials from a cell failure may be better controlled to allow temperature reduction and/or material treatment along a tortuous path through the plenum structure as previously described.

Figure 7A:
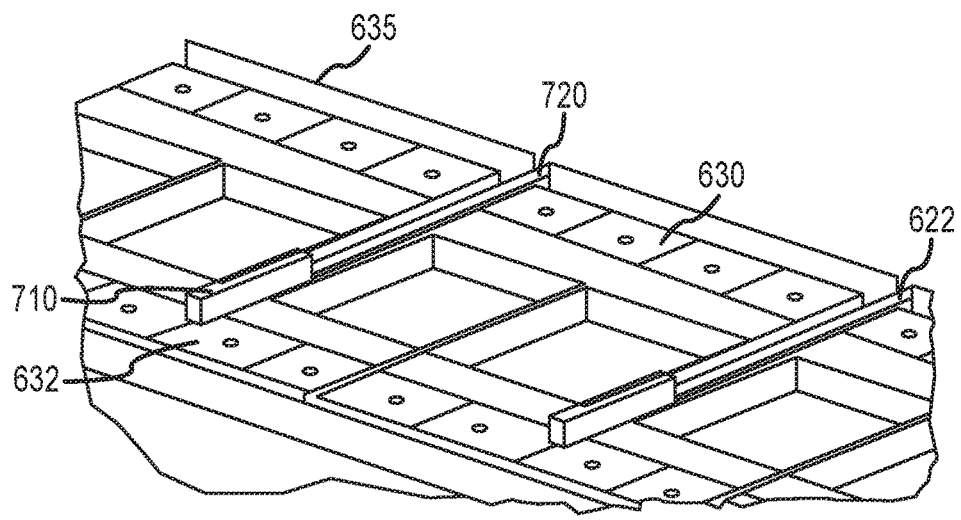
FIG. 7A is a partial view of the exemplary battery module of FIG. 6, in accordance with an illustrative embodiment.

FIG. 7A shows a close-up view of tray 635 according to some embodiments of the present technology. As noted above, tray 635 may include the bus bars coupling each cell within a cell block, such as intra cell block bus bar 630, as well as the bus bars coupling each cell block to an adjacent cell block, such as inter cell block bus bar 632. Tray 635 may form a distance or thickness within each cell block between the cells of the cell block and the shroud that may include the cell block vents 627. This distance may produce a small interior plenum of each cell block in which effluents may flow prior to being delivered into a battery pack plenum through the cell block vents. Because inter cell block bus bars 632 are positioned to extend between adjacent cell blocks, bulkhead 622 may include a notch to accommodate the bus bars. By forming this notch, a pathway may be formed between adjacent cell blocks. Additionally, a channel 720 may be formed in the tray 635, and may provide a channel for wiring to extend across the module between cell blocks.

These pathways, if left unblocked, may provide access between cell blocks for effluents of a failed cell or cell block to contact cells of the adjacent cell block. If allowed to occur, the effluents may cause damage or failure to the adjacent cells, which may propagate a failure from cell block to cell block, and which may proceed throughout the battery pack. Accordingly, some embodiments may utilize a bus bar seal 710 to block access for effluent gases and particles generated in one cell block from passing into neighboring cell blocks. Bus bar seal 710 may be or include a single piece of material or multiple pieces of material that may provide both protection against effluent materials passing between neighboring cell blocks, as well as insulation between components that may be at different electrical potential.

Figure 7B:
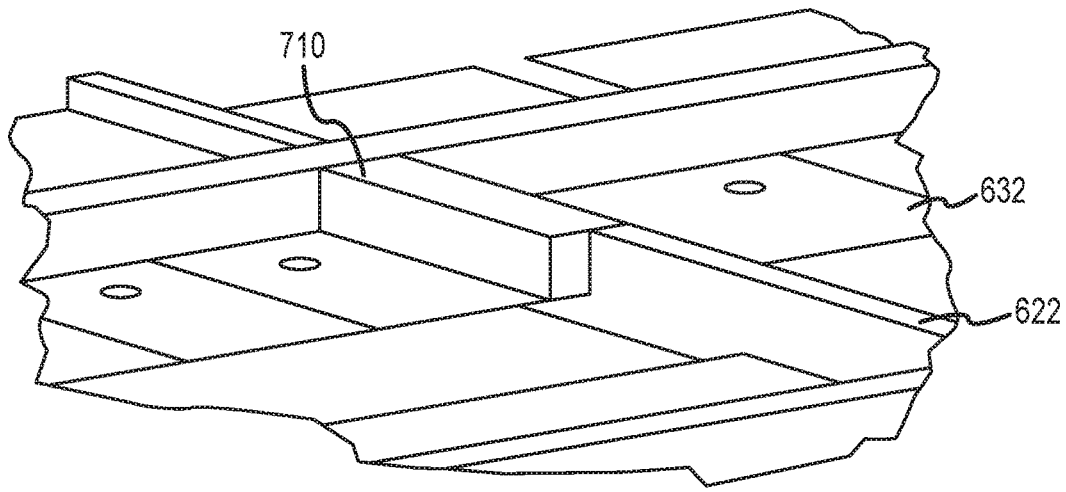
FIG. 7B is a partial view of an exemplary battery module, in accordance with an illustrative embodiment.

FIG. 7B illustrates an additional view of bus bar seal 710 when positioned about bulkhead 622 and bus bar 632. Bus bar seal 710 may extend about bus bar 632 to form a seal capable of limiting or preventing gas or other effluent material from passing along bus bar 632 from one cell into an adjacent cell. The seal about bus bar 632 may be formed upon coupling of the bus bar seal 710 to bus bar 632, or may be formed during an event, such as failure of a cell or cell block. Bus bar seal 710 may also define a slot or space to extend across bulkhead 622, which may limit any gaps between the bus bar seal 710 and bulkhead 622. Bus bar seal 710 may extend slightly above (or below when inverted) a height of bulkhead 622. This may allow shroud 625 to compress bus bar seal 710 along a length of the material to further ensure gaps are limited or removed between the bus bar seal 710, the bus bar 632, and/or the bulkhead 622.

Figure 7C:
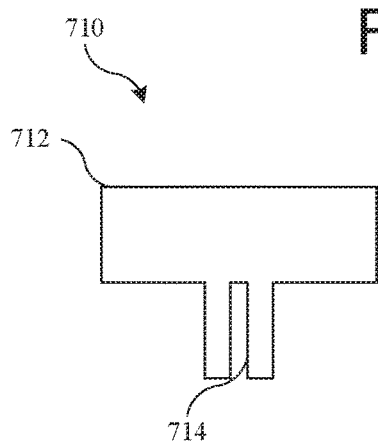
FIG. 7C is a schematic end view of an exemplary bus bar seal, in accordance with an illustrative embodiment.

FIG. 7C illustrates a schematic view of an exemplary bus bar seal 710 according to embodiments of the present technology. Bus bar seal 710 may include a defined shape, such as illustrated, but other materials may be utilized for bus bar seal 710, which may be more amorphous during coupling operations. When including a defined shape, bus bar seal 710 may be characterized by a shape configured to reduce, limit, or prevent gaps about a bus bar to which bus bar seal 710 may be coupled about, as well as reduce, limit, or prevent gaps with a component with which bus bar seal 710 may be coupled, such as bulkhead 622. For example, bus bar seal 710 may include a first surface 712 characterized by a planar or substantially planar profile, which may provide contact with a shroud along an entire length of the bus bar seal 710 at first surface 712. Bus bar seal 710 may also define a slot 714, which may extend about a bulkhead or other component separating adjacent cell blocks.

Figure 7D:
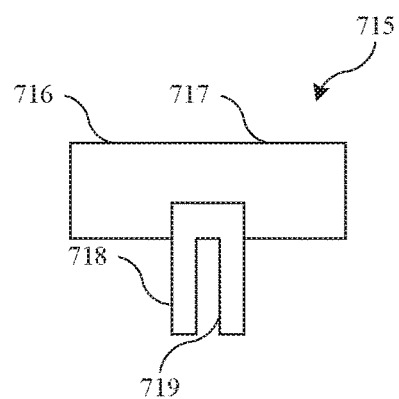
FIG. 7D is a schematic end view of an exemplary bus bar seal, in accordance with an illustrative embodiment.

In some embodiments, bus bar seal 710 may be one or more pieces of material having a defined shape, such as illustrated. Bus bar seal 710 may be one piece, two pieces, three pieces, four pieces, or more, although it is to be understood that the more pieces included in the design may provide more locations for seepage of effluent materials at the junctures of the pieces. A one-piece design of bus bar seal 710 may include an annular component, or a component defining a rectangular, ovular, or other gap within which bus bar 632 may be disposed. A one-piece design of bus bar seal 710 may also include a clam-shell configuration or configuration including a joint connecting two elongate elements which may be compressed about a bus bar. An exemplary two-piece design is shown in FIG. 7D with bus bar seal 715. Bus bar seal 715 may include a first component 716, which may include a surface 717 that may contact a shroud or other housing component of a battery module. Bus bar seal 715 may also include a second component 718, which may define a slot 719 within which a bulkhead may be seated. Utilizing a multi-piece bus bar seal may produce wider or thicker bus bar seals as the creepage and clearance requirements may become more difficult to maintain. Accordingly, a single-piece design may afford more compact components with reduced creepage and clearance requirements.

The materials used for a bus bar seal may depend on the particular design in some embodiments. For example, a one-piece bus bar seal defining an ovular or rectangular gap for a bus bar may be characterized by an elasticity allowing the bus bar seal to be stretched over terminal connections of the bus bar and positioned proximate an interior position of the bus bar, such as a central location between terminals of the bus bar. Accordingly, exemplary bus bar seals may be characterized by up to or greater than about a 500% stretch-to-failure property, although in embodiments the bus bar seal may be characterized by a stretch-to-failure amount of less than or about 450%, less than or about 400%, less than or about 350%, less than or about 300%, less than or about 250%, less than or about 200%, less than or about 150%, or less depending on the amount of stretch required to position the bus bar seal about a central or interior portion of a bus bar. This may also be based on a shape of the bus bar itself. For example, a rectangular bus bar may allow a bus bar seal to be slid into place, which may utilize a minimal amount of stretch. In other embodiments in which portions of the bus bar may be characterized by a length greater than the length of a position at which the bus bar seal may be coupled, the bus bar seal may be characterized by a greater amount of flexibility.

The bus bar seal may be overmolded on a bus bar, which may allow use of flowable or setting materials. When the bus bars are coupled with cells or cell blocks of a battery pack, the voltage may increase across the bus bar and any material contacting the bus bar, such as the bus bar seal material. A bulkhead, as well as other components within the battery module, may be at ground potential, while the bus bars may be at high voltage depending on the number of cells coupled within the module. Because of the electrical potential of the bus bar, materials utilized for the bus bar seal may be limited by the ability to maintain electrical isolation between the bus bar and the bulkhead. For example, a water-based putty or material may be beneficial in providing a complete seal about the bus bar and the bulkhead. However, such a material may provide an electrical path between the components before setting. Accordingly, in embodiments, the bus bar seal material may be characterized by maintaining electrical isolation of the bus bar both in operation as well as during manufacturing operations. When used in overmolding configurations, a settable material may be acceptable when it may be fully set prior to installation in the bus bar tray, or before the bus bar is electrically coupled with cells.

Exemplary materials that may be used in bus bar seals according to the present technology may include a variety of materials providing electrical insulation, chemical inertness to effluent materials, and temperature resistance. Exemplary materials may include silicone-containing materials, ceramic materials, thermoplastic-containing materials, polymeric materials, and a range of other materials that may provide one or more electrical or thermal properties. Exemplary materials may include intumescent materials or intumescent coatings on any of the previously noted materials. Exemplary materials may include materials that ablate, including ablation of layers of material, during exposure to high temperature or reactive materials. For example, when exemplary bus bar seal materials are contacted by high-temperature effluents, an outer surface of the bus bar seal may ablate, while interior materials or materials along an opposite side of the bus bar seal may be maintained, or may retain their structural rigidity. Exemplary materials may include composite materials including plastic or other material filled with protective materials. Exemplary materials may include viscous materials forming a seal about a bus bar. Exemplary materials may include foams or expanding materials. Exemplary materials may also include additives or components such as fire retardant additives or materials.

In some embodiments the bus bar seal may be insulative and may be configured to withstand voltages greater than or about 100 V, greater than or about 200 V, greater than or about 300 V, greater than or about 400 V, greater than or about 500 V, greater than or about 600 V, greater than or about 700 V, greater than or about 800 V, greater than or about 900 V, greater than or about 1000 V, greater than or about 1200 V, greater than or about 1400 V, greater than or about 1600 V, greater than or about 1800 V, greater than or about 2000 V, greater than or about 2200 V, greater than or about 2400 V, greater than or about 2600 V, greater than or about 2800 V, greater than or about 3000 V, greater than or about 3200 V, greater than or about 3400 V, greater than or about 3600 V, greater than or about 3800 V, greater than or about 4000 V, or greater either as operating voltages or peak voltages. Accordingly, exemplary bus bar seals may be characterized by a comparative tracking index value of greater than or about 250 V, greater than or about 400 V, or greater than or about 600 V. Additionally, bus bar seals according to the present technology may be included in a Performance Level Category of 2, 1, or zero.

Creepage and clearance requirements may vary based on the rating of the bus bar material. For example, utilizing a bus bar seal in a Performance Level Category class zero, may afford lower creepage and clearance values than a class 1 material. In embodiments, exemplary bus bar seal materials may afford creepage and clearance tolerances of less than or about 50 mm, and may afford creepage and clearance tolerances of less than or about 45 mm, less than or about 40 mm, less than or about 35 mm, less than or about 30 mm, less than or about 25 mm, less than or about 20 mm, less than or about 19 mm, less than or about 18 mm, less than or about 17 mm, less than or about 16 mm, less than or about 15 mm, less than or about 14 mm, less than or about 13 mm, less than or about 12 mm, less than or about 11 mm, less than or about 10 mm, less than or about 9 mm, less than or about 8 mm, less than or about 7 mm, less than or about 6 mm, less than or about 5 mm, less than or about 4 mm, less than or about 3 mm, less than or about 2 mm, less than or about 1 mm, or less in embodiments.

Exemplary bus bar seals or materials may be characterized based on time and/or temperature requirements during events. For example, during a failure event, one or more cells within a cell block may vent materials, which may include high-temperature materials. The cells within a cell block may vent relatively simultaneously, or cells within a cell block may fail in overlapping or sequential events. Depending on the number of cells within a cell block, the venting may occur for a period of time. Accordingly, bus bar seals according to the present technology may be configured to withstand temperatures of greater than or about 100° C. for time periods greater than or about 10 seconds. Additionally, bus bar seals or materials may be characterized by an ability to maintain higher temperatures and/or greater periods of time. For example, bus bar seals may be capable of withstanding temperatures greater than or about 150° C., greater than or about 200° C., greater than or about 250° C., greater than or about 300° C., greater than or about 350° C., greater than or about 400° C., greater than or about 450° C., greater than or about 500° C., greater than or about 550° C., greater than or about 600° C., greater than or about 650° C., greater than or about 700° C., greater than or about 750° C., greater than or about 800° C., greater than or about 850° C., greater than or about 900° C., greater than or about 950° C., greater than or about 1000° C., or higher.

Additionally, the bus bar seals may be capable of withstanding any of these temperatures for greater than or about 20 seconds, greater than or about 30 seconds, greater than or about 40 seconds, greater than or about 50 seconds, greater than or about 1 minute, greater than or about 2 minutes, greater than or about 5 minutes, greater than or about 10 minutes, greater than or about 15 minutes, greater than or about 20 minutes, greater than or about 25 minutes, greater than or about 30 minutes, greater than or about 35 minutes, greater than or about 40 minutes, greater than or about 45 minutes, greater than or about 50 minutes, greater than or about 55 minutes, greater than or about 60 minutes, greater than or about 65 minutes, greater than or about 70 minutes, greater than or about 75 minutes, greater than or about 80 minutes, greater than or about 85 minutes, greater than or about 90 minutes, or longer.

In some embodiments, the bus bar seals may be configured to withstand a first temperature for a first period of time, and a second temperature less than the first temperature for a second period of time. For example, while the cells of a cell block are venting, the bus bar seal may be contacted by high temperature effluents, which may heat up surrounding components, such as the bus bar. After the effluents have been released from a cell block, such as through a cell block vent, the temperature within the cell may be lower than the initial temperature of the effluents, although components such as a bus bar may still be characterized by an increased temperature for an additional period of time while the heat dissipates. Accordingly, any of the time periods and or temperatures listed may occur as the first time or temperature or the second time or temperature, and exemplary materials may be configured to withstand any of these combinations.

Wiring may also connect cells and cell blocks of the present technology, and wire harnesses may extend within a bus bar tray as well. Channels 720, which may be used for harnesses, may provide additional passageways for effluent materials in embodiments where the channels extend across a bulkhead from one cell block to a next cell block. Accordingly, in some embodiments, a second seal material may be positioned within the tray where a wire harness extends across adjacent cells. The second seal may be characterized by any of the properties of the bus bar seal materials described above. In some embodiments, additional materials may be utilized for the wire harness seals because the wire harnesses may not experience the temperatures of a bus bar, and may not be at a high-voltage potential unlike bus bars.

Figure 8:
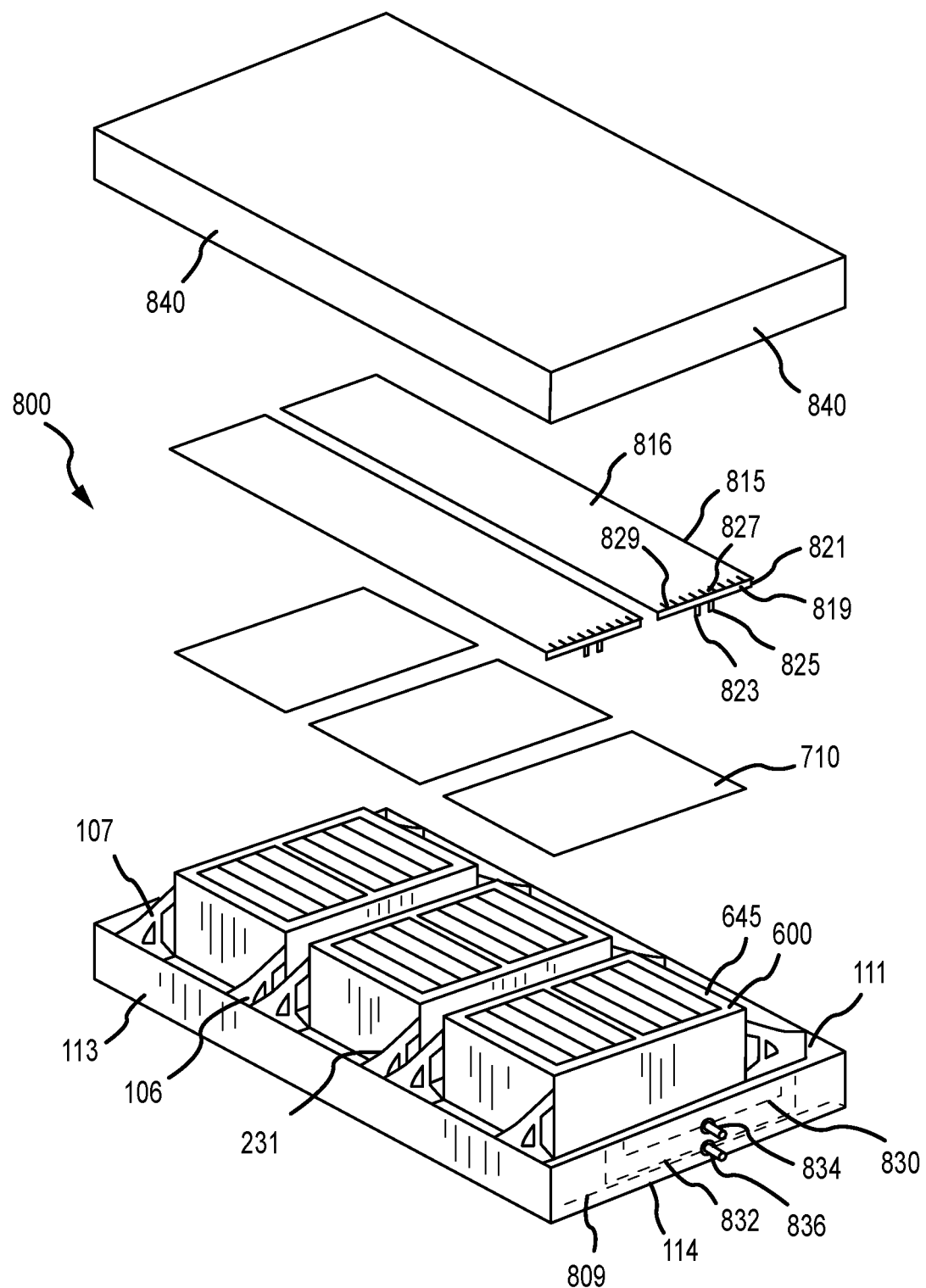
FIG. 8 is an exploded view of an exemplary battery pack, in accordance with an illustrative embodiment.

FIG. 8 shows an exploded perspective view of components of a battery pack 800 according to embodiments of the present technology. Battery pack 800 may include any of the components previously described. For example, battery pack 800 may include a structure to contain and support one or more battery cells collected into cell blocks and/or modules as previously described. Battery pack 800 may illustrate a rotated view of battery pack 100 in embodiments. The structure of battery pack 800 may include side rail 111 and side rail 113 coupled proximate opposite sides of a plate structure 114. A plurality of lateral members 106 may be disposed extending between the side rails, and may be coupled with the side rails such as by welding, bonding, or including an adhesive between the side rails and lateral members. In embodiments, the side rails may include buttresses 231, which may be coupled on an outer surface with the side rails as illustrated. The battery pack structure may also include a front panel 107 as previously illustrated in FIG. 1, as well as rear panel 809, which may be similar to rear panel 109, but is illustrated in transparent view in FIG. 8. Rear panel 809 is illustrated in this way to provide visual access to components further discussed below that may be otherwise hidden by rear panel 809.

Seated along and running parallel with the lateral members 106 may be a plurality of battery modules 600. Battery modules 600 are shown in an orientation subsequent installation where they have been inverted from the direction illustrated previously in FIG. 6. Accordingly, individual battery cell vents and/or electrical terminals may be positioned facing towards plate structure 114. The battery modules 600 may be coupled through a top cover 645 and a shroud as previously described to a top portion of lateral members 106. Lateral members 106 may suspend or at least partially suspend battery modules 600 above plate structure 114 to provide a plenum space between the battery modules 600 and the plate structure 114. The plenum space may be divided into plenum chambers between the lateral members 106, which may be coupled with the plate structure 114 either directly or indirectly. For example, a continuous seam weld, spot weld, bond seam, adhesive, fasteners, or other mechanical couplers commonly used to join structural components may be disposed along a length of each lateral member 106 to connect the members to the plate structure 114.

As noted in FIG. 6, a thermal interface material may be positioned between battery cells within each cell block and top cover 645. An additional thermal interface material 810 may be coupled on an opposite surface of top cover 645 to thermal interface material 640 of FIG. 6. Thermal interface material 810 may be disposed along battery modules 600 individually, or as a sheet extending along an entire top surface of battery pack 800, or in other configurations. The sheets of thermal interface material 810 may be included to further conduct or transfer heat from battery modules 600 to heat exchangers 815, which may be coupled overlying thermal interface material 810.

Heat exchanger 815 may be included as a heat transfer device for further removing heat generated during operation of the system from battery pack 800. Heat exchanger 815 may include two or more plates coupled together to form a volume there between, and through which a heat transfer fluid may be flowed. The two plates may be extruded aluminum, and may be other materials including metals, plastics, polymeric materials, ceramics, or other materials that may provide properties including flexibility, corrosion resistance, structural rigidity, heat transfer capability, or other useful properties for heat transfer. Interior surfaces of the at least two plates of heat exchanger 815 may include a topography such that when the plates are joined the interior surfaces of the plates may define a volume, such as a number of channels 827, 829, creating a flow system through heat exchanger 815. Additional plates or materials may be included between outer plates, or within channels defined by the outer plates. For example, materials that increase turbulence within a channel may be included to increase heat transfer to the heat exchanger 815.

The flow system through heat exchanger 815 may be defined from manifolds 819, 821 coupled with one end of the heat exchanger 815. Manifold 819 may be an inlet manifold, and may include an inlet 823 for receiving a heat transfer fluid to the heat exchanger. The manifold 819 may distribute the heat transfer fluid laterally through the manifold as well as through first channels 827. Channels 827 may run normal to the manifold and extend along a length of heat exchanger 815 from rear panel 809 to front panel 107. At a distal end of heat exchanger 815 proximate front panel 107, access may be defined from first channels 827 to second channels 829. Heat transfer fluid may return through channels 829 in a reverse-parallel flow pattern before being delivered into manifold 821, which may be a return manifold. Manifold 821 may include an outlet 825, which may deliver fluid from heat exchanger 815.

Heat exchanger inlet 823 and outlet 825 may couple, respectively, with an inlet distributer 830 and an outlet distributer 832. Distributers 830, 832 may provide access for multiple heat exchangers 815 to be connected to a single fluid distribution system of a battery pack. In embodiments, battery pack 800 may include at least one, two, three, four, or more heat exchangers coupled with individual inlet and outlet distributers. Distributers 830 and 832 may be vertically disposed from one another to limit a depth profile. The distributers may be positioned between a lateral member 106 and rear panel 809 within battery pack 800. Inlet distributer 830 and outlet distributer 832 may be accessed, respectively, through inlet port 834 and outlet port 836. Inlet port 834 and outlet port 836 may be coupled with an external fluid management system from battery pack 800, which may include delivery to a cooled fluid reservoir, a condenser structure, or an additional heat exchanger located outside of battery pack 800 and configured to remove collected heat from the heat transfer fluid.

Heat exchangers 815 may be characterized by a number of outer profiles, but in embodiments may be characterized by a substantially planar surface on one or more of top and bottom surfaces of the heat exchanger. Although tubular, ovular, or other rounded or dynamic profiles may be used for heat exchangers 815, in some embodiments a planar surface may be utilized to increase an area of contact between the heat exchanger 815 and thermal interface material 810. The planar outer surface may be characterized such that a profile of individual channels is limited on the exterior surface. For example, divisions between interior channels may be contained within an interior region of the heat exchanger, and may not be visible along an outer surface of the heat exchanger 815 to provide a flat or substantially flat surface along a top and bottom surface of the heat exchangers. As illustrated, channels 827 and 829 may include visible portions proximate manifolds 819, 821, although this area may be limited to less than or about 10% of a length across heat exchanger 815, and may be limited to less than or about 9% of the length, less than or about 8% of the length, less than or about 7% of the length, less than or about 6% of the length, less than or about 5% of the length, less than or about 4% of the length, less than or about 3% of the length, less than or about 2% of the length, less than or about 1% of the length, or less in embodiments.

A plurality of apertures 816 may be defined through heat exchanger 815 to provide access to couple heat exchanger 815 to lateral members 106, and through thermal interface material 810. The apertures 816 may be located about heat exchanger 815 to limit protrusion within channels defined on the interior of the heat exchanger, and the apertures may be defined channels extending through the heat exchanger, while being fluidly isolated from interior channels defined within the heat exchangers. The apertures may also be located to limit electromagnetic interference from the battery pack 800. Thermal interface material 810 may be a compressible material, which may include certain flow or deformation characteristics such that compression caused by coupling the heat exchanger 815 to the lateral members 106 may cause regions of thermal interface material 810 to extend about fasteners, bolts, or other mechanical couplers extending through thermal interface material 810. Accordingly, a gap free or substantially or essentially gap free coupling of the heat exchangers 815 to lateral members 106 may be afforded, and may provide a uniform, substantially uniform, or essentially uniform coupling along a bottom surface of heat exchanger 815 with thermal interface material 810.

In operation, heat transfer fluid included within heat exchanger 815 may be configured to flow normal to a direction of battery cells contained within each module. For example, battery modules 600 may extend parallel with lateral members 106, and extending between side rail 111 and side rail 113. Within heat exchanger 815, channels 827, 829 directing heat transfer fluid may run across lateral members 106, and extend between front panel 107 and rear panel 809. By this arrangement, as heat is being received from battery cells within a module, the heat may be delivered across a battery cell block and away from a battery module into the next battery module, instead of along a battery module. This arrangement may facilitate heat transfer into lateral members 106, and may more evenly distribute heat away from battery modules such as malfunctioning modules, which may be producing excessive heat. Although an alternative flow path may be utilized in embodiments in which the heat transfer channels run parallel with individual battery modules, such an arrangement may maintain heat generated within a specific module, and may facilitate excess heat generation into neighboring cells of the battery module.

Battery pack 800 may include a lid 840 that extends about heat exchangers 815 and couples with side rails 111, 113 as well as front panel 107 and rear panel 109. In combination with plate structure 114, the side rails, and the end panels, a liquid tight structure may be afforded. In embodiments, the battery pack 800 may also be substantially air tight or provide a controlled interior environment for the battery pack 800 to limit gaseous transfer from the battery pack 800 except through pack vents as previously discussed. It is to be understood, however, that depending on the materials utilized in the construction, a natural amount of permeation of vapor may occur. The closed pack system may allow improved heat dissipation and solid particle removal from any effluents of a battery cell utilizing the tortuous path defined along the plenum and lateral members as previously described.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A battery pack comprising:
    a plurality of cell blocks each containing at least two battery cells, the plurality of cell blocks including a first cell block and a second cell block;
    a plate, wherein each cell block comprises a vent facing the plate; and
    a lateral member coupled to the plate between the first cell block and the second cell block, the lateral member comprising:
        a first wall facing the first cell block, wherein the lateral member defines a first port in the first wall, and
        a second wall facing the second cell block, wherein the lateral member defines a second port in the second wall, and wherein the lateral member comprises an internal conduit between the first wall and the second wall;
    wherein the plurality of cell blocks, the lateral member, and the plate at least partially define a volume inside the battery pack, wherein the lateral member separates the volume into a first chamber between the plate and a vent of the first cell block, wherein the lateral member separates the volume into a second chamber between the plate and a vent of the second cell block, and wherein a lateral flow path is defined between the first chamber and the second chamber through the first port, the internal conduit, and the second port in the lateral member.

2. The battery pack of claim 1, wherein the plurality of cell blocks comprises:
    a first row of cell blocks comprising a first subset of the plurality of cell blocks, and
    a second row of cell blocks comprising a second subset of the plurality of cell blocks; and
    wherein the lateral member is positioned between the first row of cell blocks and the second row of cell blocks.

3. The battery pack of claim 1, wherein the internal conduit of the lateral member defines at least one directional change in a fluid path through the internal conduit of the lateral member.

4. The battery pack of claim 3, wherein the at least one directional change equals or exceeds 90 degrees.

5. The battery pack of claim 1, wherein the internal conduit comprises a screen configured to inhibit flow of solid material through the internal conduit.

6. The battery pack of claim 1, wherein the volume mitigates effluents of the cell blocks before delivering the effluents to a battery pack vent towards the exterior of the battery pack.

7. The battery pack of claim 1, wherein at least four battery cells are disposed within each cell block of the plurality of cell blocks.

8. The battery pack of claim 1, wherein each cell block comprises at least two abutting prismatic battery cells.

9. The battery pack of claim 1, wherein the volume is configured to separate at least a portion of solid matter from effluents of a battery cell as the effluents flow toward the exterior of the battery pack.

10. The battery pack of claim 9, wherein the volume is configured to mitigate effluents of the battery cell by reducing a temperature of the effluents as the effluents flow between the battery cell and the exterior of the battery pack.

11. The battery pack of claim 1, wherein the cell block is sealed when the cell block is below a threshold internal pressure.

12. The battery pack of claim 11, wherein each cell block vent is configured to open and direct effluents of the battery cells of a cell block towards the volume when the cell block reaches the threshold internal pressure.

13. The battery pack of claim 1, wherein each cell block comprises an insulation material disposed between a structure of the cell block and at least one battery cell of the cell block.

* * * * *